(12) United States Patent
Yi et al.

(10) Patent No.: US 12,155,491 B2
(45) Date of Patent: Nov. 26, 2024

(54) METHOD AND APPARATUS FOR TRANSMITTING UPLINK CHANNEL IN WIRELESS COMMUNICATION SYSTEM

(71) Applicant: Samsung Electronics Co., Ltd., Gyeonggi-do (KR)

(72) Inventors: Junyung Yi, Gyeonggi-do (KR); Youngbum Kim, Gyeonggi-do (KR); Hyunseok Ryu, Gyeonggi-do (KR); Sungjin Park, Gyeonggi-do (KR); Youngrok Jang, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 322 days.

(21) Appl. No.: 17/576,119

(22) Filed: Jan. 14, 2022

(65) Prior Publication Data

US 2022/0224456 A1    Jul. 14, 2022

(30) Foreign Application Priority Data

Jan. 14, 2021 (KR) .................. 10-2021-0005151
Feb. 3, 2021 (KR) .................. 10-2021-0015217
(Continued)

(51) Int. Cl.
H04L 1/1867 (2023.01)
H04W 52/14 (2009.01)
H04W 72/1268 (2023.01)

(52) U.S. Cl.
CPC ......... *H04L 1/1887* (2013.01); *H04W 52/146* (2013.01); *H04W 72/1268* (2013.01)

(58) Field of Classification Search
CPC .............. H04L 1/1887; H04W 52/146; H04W 52/1268
See application file for complete search history.

(56) References Cited

U.S. PATENT DOCUMENTS 10,492,151 B2 * 11/2019 Akkarakaran ...... H04W 52/362
11,864,122 B2 *  1/2024 Fu ..................... H04W 52/325
(Continued)

FOREIGN PATENT DOCUMENTS

CN    107079499 B  *  6/2020 ........... H04L 1/1854
CN    114765495 A  *  7/2022 ............... H04L 1/16
(Continued)

OTHER PUBLICATIONS

Vivo, "Discussion on Solutions for PUSCH Coverage Enhancement", R1-2007680, 3GPP TSG RAN WG1 #103-e, Oct. 26-Nov. 13, 2020, 9 pages.
(Continued)

*Primary Examiner* — Shean Tokuta
(74) *Attorney, Agent, or Firm* — The Farrell Law Firm, P.C.

(57) ABSTRACT

The disclosure relates to converging a 5G communication system for supporting higher data rates beyond a 4G system with a technology for IoT, and may be applied to intelligent services based on the 5G communication technology and IoT-related technology. The disclosure provides a method performed by a terminal in a communication system, including receiving, from a base station, configuration information for a PUSCH repetition, identifying a configured time domain window for the PUSCH repetition based on the configuration information, and performing one or more repetitions of PUSCH transmission with the base station in the configured time domain window, wherein power consistency and phase continuity of the PUSCH transmission are maintained in the one or more repetitions, and wherein one or more TPC commands accumulated in the configured time domain window are applied after the configured time domain window.

18 Claims, 20 Drawing Sheets

(30) Foreign Application Priority Data

Apr. 6, 2021 (KR) ........................ 10-2021-0044825
May 14, 2021 (KR) ........................ 10-2021-0063025

(56) References Cited

U.S. PATENT DOCUMENTS

| | | | | |
|---|---|---|---|---|
| 2018/0146438 | A1* | 5/2018 | Yi | H04W 52/24 |
| 2018/0213484 | A1* | 7/2018 | Oh | H04W 52/42 |
| 2019/0313442 | A1 | 10/2019 | Hosseini et al. | |
| 2020/0022087 | A1* | 1/2020 | Dou | H04W 52/40 |
| 2020/0037260 | A1* | 1/2020 | Fu | H04W 52/325 |
| 2020/0092858 | A1 | 3/2020 | Ye et al. | |
| 2020/0267756 | A1 | 8/2020 | Fakoorian et al. | |
| 2021/0014095 | A1* | 1/2021 | Ly | H04W 72/23 |
| 2021/0029646 | A1* | 1/2021 | Park | H04W 52/367 |
| 2021/0194556 | A1* | 6/2021 | Ly | H04L 5/0094 |
| 2021/0227474 | A1* | 7/2021 | Khoshnevisan | H04W 52/146 |
| 2021/0281360 | A1* | 9/2021 | Xu | H04W 72/20 |
| 2021/0392679 | A1* | 12/2021 | Kim | H04L 1/1896 |
| 2021/0409244 | A1* | 12/2021 | Taherzadeh Boroujeni | H04L 25/0204 |
| 2022/0046552 | A1* | 2/2022 | Xu | H04L 5/0094 |
| 2022/0104138 | A1* | 3/2022 | Park | H04L 5/0094 |
| 2022/0132534 | A1* | 4/2022 | Jang | H04L 5/0044 |
| 2022/0201618 | A1* | 6/2022 | Bae | H04W 52/14 |
| 2022/0210844 | A1* | 6/2022 | MolavianJazi | H04L 5/0053 |
| 2022/0224456 | A1* | 7/2022 | Yi | H04W 72/1268 |
| 2022/0224484 | A1* | 7/2022 | Yi | H04L 5/0051 |
| 2022/0225240 | A1* | 7/2022 | Fakoorian | H04W 72/21 |
| 2022/0225360 | A1* | 7/2022 | Yi | H04W 72/23 |
| 2022/0279455 | A1* | 9/2022 | Cozzo | H04W 72/1268 |
| 2023/0008498 | A1* | 1/2023 | Lee | H04W 72/23 |
| 2023/0014273 | A1* | 1/2023 | Wu | H04L 5/0051 |
| 2023/0079660 | A1* | 3/2023 | Fu | H04W 72/23 370/329 |
| 2023/0131305 | A1* | 4/2023 | Cozzo | H04W 56/0045 370/329 |
| 2023/0179333 | A1* | 6/2023 | Cirik | H04W 52/146 |
| 2023/0209514 | A1* | 6/2023 | Cozzo | H04W 72/0446 370/336 |
| 2023/0276446 | A1* | 8/2023 | Matsumura | H04L 5/0012 370/329 |
| 2023/0291523 | A1* | 9/2023 | Hasegawa | H04L 5/0094 |
| 2023/0309022 | A1* | 9/2023 | Ling | H04W 52/146 |
| 2023/0344583 | A1* | 10/2023 | Yi | H04L 5/0053 |
| 2023/0345470 | A1* | 10/2023 | Yao | H04W 72/232 |
| 2023/0354205 | A1* | 11/2023 | Khoshnevisan | H04W 52/10 |

FOREIGN PATENT DOCUMENTS

| | | | | |
|---|---|---|---|---|
| KR | 10-2021-0095430 | | 8/2021 | |
| TW | 202110249 A | * | 3/2021 | H04L 27/2613 |
| TW | 202220403 A | * | 5/2022 | H04L 1/1887 |
| WO | WO-2018043340 A1 | * | 3/2018 | H03H 9/05 |
| WO | WO-2018175784 A1 | * | 9/2018 | H04B 7/0617 |
| WO | WO-2018194352 A1 | * | 10/2018 | H04L 27/2601 |
| WO | WO-2019019186 A1 | * | 1/2019 | H04W 52/146 |
| WO | WO-2019151789 A1 | * | 8/2019 | H04W 52/10 |
| WO | WO-2019190265 A1 | * | 10/2019 | H04L 5/0053 |
| WO | WO-2020199956 A1 | * | 10/2020 | H04L 5/0023 |
| WO | WO-2020204532 A1 | * | 10/2020 | |
| WO | WO-2022235033 A1 | * | 11/2022 | H04B 7/0695 |
| WO | WO-2022237793 A1 | * | 11/2022 | |

OTHER PUBLICATIONS

Moderator (China Telecom), "[103-e-NR-CovEnh-04] Summary of Email Discussion on PUSCH Coverage Enhancements", R1-2009814, 3GPP TSG RAN WG1 Meeting #103e, Oct. 26-Nov. 13, 2020, 204 pages.

International Search Report dated Apr. 27, 2022 issued in counterpart application No. PCT/KR2022/000639, 7 pages.

* cited by examiner

FIG. 3

One symbol pattern

| | |
|---|---|
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

301

Two symbol pattern

| | |
|---|---|
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |

302

One symbol pattern

| | |
|---|---|
| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

303

Two symbol pattern

| | |
|---|---|
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

304

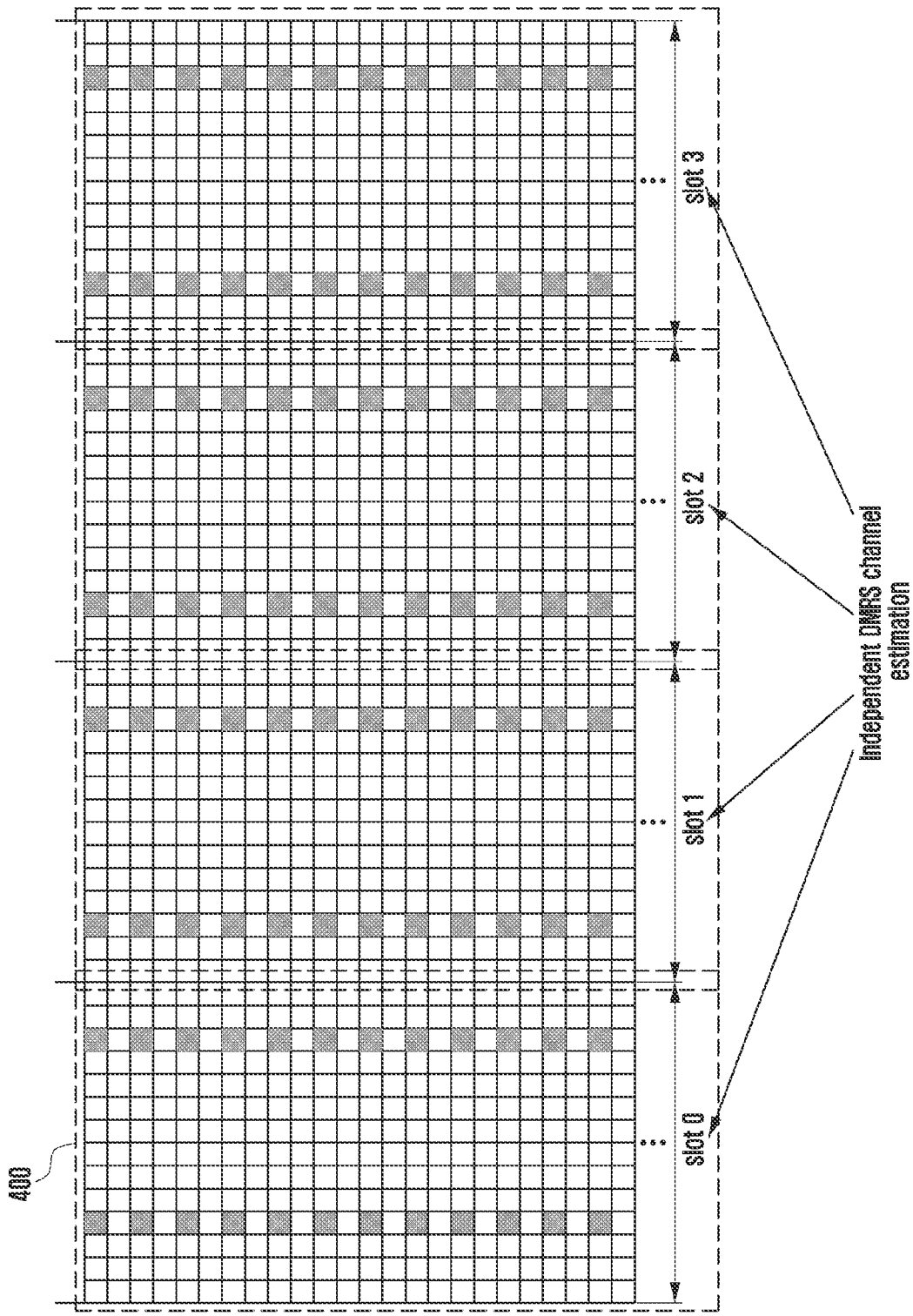

FIG. 12B

Table 6.4.1.1.3-3: PUSCH DM-RS positions l̄ within a slot for single-symbol DM-RS and intra-slot frequency hopping disabled

| l̄d in symbols | DM-RS positions l̄ | | | | | | | |
|---|---|---|---|---|---|---|---|---|
| | PUSCH mapping type A | | | | PUSCH mapping type B | | | |
| | dmrs-AdditionalPosition | | | | dmrs-AdditionalPosition | | | |
| | pos 0 | pos 1 | pos 2 | pos 3 | pos 0 | pos 1 | pos 2 | pos 3 |
| <4 | — | — | — | — | l₀ | l₀ | l₀ | l₀ |
| 4 | l₀ | l₀ | l₀ | l₀ | l₀ | l₀ | l₀ | l₀ |
| 5 | l₀ | l₀ | l₀ | l₀ | l₀ | l₀,4 | l₀,4 | l₀,4 |
| 6 | l₀ | l₀ | l₀ | l₀ | l₀ | l₀,4 | l₀,4 | l₀,4 |
| 7 | l₀ | l₀ | l₀ | l₀ | l₀ | l₀,4 | l₀,4 | l₀,4 |
| 8 | l₀ | l₀,7 | l₀,7 | l₀,7 | l₀ | l₀,6 | l₀,3,6 | l₀,3,6 |
| 9 | l₀ | l₀,7 | l₀,7 | l₀,7 | l₀ | l₀,6 | l₀,3,6 | l₀,3,6 |
| 10 | l₀ | l₀,9 | l₀,6,9 | l₀,6,9 | l₀ | l₀,8 | l₀,4,8 | l₀,3,6,9 |
| 11 | l₀ | l₀,9 | l₀,6,9 | l₀,6,9 | l₀ | l₀,8 | l₀,4,8 | l₀,3,6,9 |
| 12 | l₀ | l₀,9 | l₀,6,9 | l₀,5,8,11 | l₀ | l₀,10 | l₀,5,10 | l₀,3,6,9 |
| 13 | l₀ | l₀,11 | l₀,7,11 | l₀,5,8,11 | l₀ | l₀,10 | l₀,5,10 | l₀,3,6,9 |
| 14 | l₀ | l₀,11 | l₀,7,11 | l₀,5,8,11 | l₀ | l₀,10 | l₀,5,10 | l₀,3,6,9 |

1210

METHOD AND APPARATUS FOR TRANSMITTING UPLINK CHANNEL IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2021-0005151, 10-2021-0015217, 10-2021-0044825, and 10-2021-0063025, which were filed in the Korean Intellectual Property Office on Jan. 14, 2021, Feb. 3, 2021, Apr. 6, 2021, and May 14, 2021, respectively, the entire disclosure of each of which is incorporated herein by reference.

BACKGROUND

1. Field

The disclosure relates generally to a user equipment (UE) and a base station in a wireless communication system, and more particularly, to a method in which a UE transmits an uplink channel in a wireless communication system.

2. Description of Related Art

To meet the demand for wireless data traffic having increased since deployment of $4^{th}$ generation (4G) communication systems, efforts have been made to develop an improved $5^{th}$-generation (5G) or pre-5G communication system. Therefore, the 5G or pre-5G communication system is also referred to as a beyond 4G network or a post long-term evolution (LTE) system. The 5G communication system is considered to be implemented in higher frequency (millimeter (mm) wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as advanced access technologies have been developed.

The Internet is now evolving to the Internet of things (IoT) where distributed entities, such as things, exchange and process information without human intervention. The Internet of everything (IoE), which is a combination of the IoT and big data processing technologies through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

There is a need in the art, however, for a method and apparatus for overcoming a channel estimation failure and resulting coverage problems when a base station configures a physical uplink shared channel (PUSCH) repetition for a UE for increasing coverage for PUSCH transmission, and the UE performs repetitions of PUSCH transmission in a 5G system.

SUMMARY

The disclosure has been made to address at least the above-mentioned problems and/or disadvantages and to provide at least the advantages described below.

Accordingly, an aspect of the disclosure is to provide a method and apparatus for overcoming the channel estimation drawback when a base station configures a PUSCH repetition for a UE for increasing coverage for PUSCH transmission, and the UE performs repetitions of PUSCH transmission in a 5G system.

Another aspect of the disclosure is to provide a base station or a UE that may perform joint channel estimation for repetitions of uplink channel transmission, thereby precisely performing channel estimation and realizing increased coverage of an uplink channel.

Another aspect of the disclosure is to provide a method of controlling the consistency of transmission power for repetitions of uplink channel transmission, the continuity of a phase, and beam configuration, and thus, performing joint channel estimation for repetitions of uplink channel transmission.

In accordance with an aspect of the disclosure, a method performed by a terminal in a communication system includes receiving, from a base station, configuration information for a PUSCH repetition, identifying a configured time domain window for the PUSCH repetition based on the configuration information, and performing one or more repetitions of PUSCH transmission with the base station in the configured time domain window, wherein power consistency and phase continuity of the PUSCH transmission are maintained in the one or more repetitions, and wherein one or more transmit power control (TPC) commands accumulated in the configured time domain window are applied after the configured time domain window.

In accordance with another aspect of the disclosure, a method performed by a base station in a communication system includes transmitting, to a terminal, configuration information for a PUSCH repetition, and performing one or more repetitions of PUSCH reception with the terminal in a configured time domain window, wherein the configured time domain window is based on the configuration information, wherein power consistency and phase continuity of the PUSCH reception are maintained in the one or more repetitions, and wherein one or more TPC commands accumulated in the configured time domain window are applied after the configured time domain window.

In accordance with another aspect of the disclosure, a terminal in a communication system includes a transceiver; and a controller coupled with the transceiver and configured to receive, from a base station, configuration information for a PUSCH repetition, identify a configured time domain window for the PUSCH repetition based on the configuration information, and perform one or more repetitions of PUSCH transmission with the base station in the configured time domain window, wherein power consistency and phase continuity of the PUSCH transmission are maintained in the one or more repetitions, and wherein one or more TPC commands accumulated in the configured time domain window are applied after the configured time domain window.

In accordance with another aspect of the disclosure, a base station in a communication system includes a transceiver, and a controller coupled with the transceiver and configured to transmit, to a terminal, configuration information for a PUSCH repetition, and perform one or more repetitions of PUSCH reception with the terminal in a configured time domain window, wherein the configured time domain window is based on the configuration information, wherein power consistency and phase continuity of the PUSCH reception are maintained in the one or more repetitions, and wherein one or more TPC commands accumulated in the configured time domain window are applied after the configured time domain window.

BRIEF DESCRIPTION OF THE DRAWINGS

The above and other aspects, features and advantages of the disclosure will be more apparent from the following detailed description taken in conjunction with the accompanying drawings, in which:

FIG. 3 illustrates a demodulation-reference signal (DMRS) pattern (type 1 and type 2) used for communication between a base station and a UE in a 5G system to which the disclosure is applicable;

FIG. 4 illustrates channel estimation using a DMRS received from a single PUSCH in the time domain in the 5G system to which the disclosure is applicable;

FIG. 12B illustrates example positions for demodulation-reference signal (DMRS) according to an embodiment;

DETAILED DESCRIPTION

Figure 1:
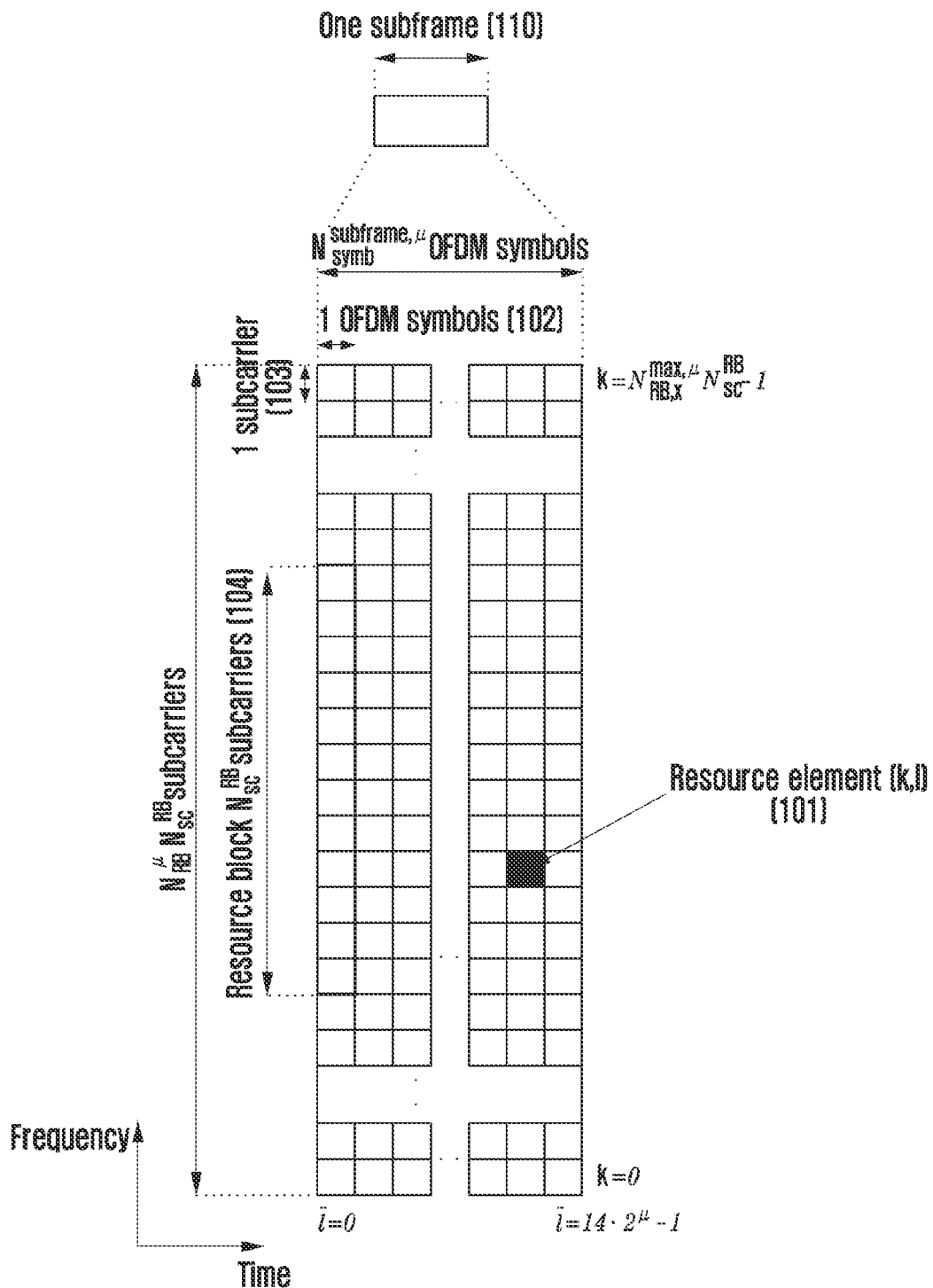
FIG. 1 illustrates the basic structure of a time-frequency domain which is a wireless resource area in which data or a control channel is transmitted in a 5G system to which the disclosure is applicable.

Hereinafter, embodiments of the disclosure will be described in detail with reference to the accompanying drawings. In the following description of embodiments of the disclosure, descriptions related to technical contents well-known in the art and not associated directly with the disclosure will be omitted for the sake of clarity and conciseness.

In the accompanying drawings, some elements may be exaggerated, omitted, or schematically illustrated. The size of each element does not completely reflect the actual size. In the drawings, identical or corresponding elements are provided with identical reference numerals.

The advantages and features of the disclosure will be apparent by the embodiments as described below in detail in conjunction with the accompanying drawings. However, the disclosure is not limited to the embodiments set forth below and may be implemented in various forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. The terms which will be described below are terms defined in consideration of the functions in the disclosure, and may be different according to users, intentions of the users, or customs. Therefore, the definitions of the terms should be made based on the contents throughout the specification.

Herein, a base station is an entity that allocates resources to terminals, and may be at least one of a gNode B, an eNode B, a Node B, a base station (BS), a wireless access unit, a base station controller, and a node on a network. A terminal may include a UE, a mobile station (MS), a cellular phone, a smartphone, a computer, or a multimedia system capable of performing communication functions. A "downlink" (DL) refers to a radio link via which a base station transmits a signal to a terminal, and an "uplink" (UL) refers to a radio link via which a terminal transmits a signal to a base station. Although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and 5G may cover exiting LTE, LTE-A, and other similar services. In addition, based on determinations by those skilled in the art, the disclosure may be applied to other communication systems through some modifications without significantly departing from the scope of the disclosure.

Although the description of a method and an apparatus provided in the embodiments of the disclosure describes embodiments of the disclosure as increasing the coverage area of a PUSCH, the disclosure is not limited thereto, and is applicable to a method of configuring a frequency resource which corresponds to another channel using the entirety of one or more embodiments provided in the disclosure or a combination of some embodiments. Therefore, the embodiments of the disclosure may be modified by those skilled in the art without departing from the scope of the disclosure.

A wireless communication system has developed to be a broadband wireless communication system that provides a high-speed and high-quality packet data service, such as high speed packet access (HSPA) of 3GPP, LTE or evolved universal terrestrial radio access (E-UTRA), LTE-advanced (LTE-A), LTE-pro, high rate packet data (HRPD) of third generation partnership project 2 (3GPP2), ultra mobile broadband (UMB), and 802.16e of IEEE, beyond the voice-based service provided at the initial stage.

An LTE system, which is a representative example of the broadband wireless communication system, employs an orthogonal frequency division multiplexing (OFDM) scheme for the downlink, and employs a single carrier frequency division multiple access (SC-FDMA) scheme for the uplink. The uplink is a radio link via which a user equipment (UE) or a mobile station (MS) transmits data or a control signal to a base station (eNode B (eNB) or a base station (BS)). The downlink is a radio link via which a base station transmits data or a control signal to a UE. In the multiple access schemes as described above, time-frequency resources used to deliver data or control information are allocated and operated in a manner to prevent overlapping of the resources, that is, to establish the orthogonality, between users, so as to identify data or control information of each user.

A 5G communication system which is beyond LTE may need to support a service that simultaneously satisfies various demands so as to freely reflect various demands of a user, a service provider, and the like. Services considered for the 5G communication system may include an enhanced mobile broadband (eMBB), massive machine type communication (mMTC), ultra reliability low latency communication (URLLC), and the like.

The eMBB aims at providing a data transmission rate higher than a data transmission rate supported by legacy LTE, LTE-A, or LTE-pro. For example, in the 5G communication system, eMBB needs to provide a maximum of 20 Gbps peak data rate in the downlink, and a maximum of 10 Gbps peak data rate in the uplink, from the perspective of a single base station. In addition, the 5G communication system needs to provide an increased user perceived data rate of a UE, in parallel with providing a peak data rate. In order to satisfy the requirements, there is a need for improved transmission or reception technologies including an advanced MIMO transmission technology. In addition, legacy LTE transmits a signal in a 2 GHz band using a maximum of 20 MHz transmission bandwidth. However, the 5G communication system uses a frequency bandwidth wider than 20 MHz in a frequency band ranging 3 to 6 GHz or in a frequency band greater than or equal to 6 GHz, and thus, a data transmission speed required by the 5G communication system may be satisfied.

In addition, the 5G communication system considers mMTC in order to support application services such as IoT. mMTC requires supporting access of a large number of UEs within a cell, increase of the coverage area of a UE, improved battery life expectancy, and reduced UE cost, for example, in order to effectively provide IoT. IoT provides a communication function via attachment to various sensors and various devices and thus, a large number of UEs needs to be supported within a cell (e.g., 1,000,000 UEs/km2). In addition, a UE that supports mMTC has a high probability of being located in a shadow area that a cell cannot cover, such as the basement of a building, in terms of the feature of the service, and may require coverage wider than those of other services of the 5G communication system. The UE that supports mMTC needs to be manufactured as an inexpensive UE, and the battery of the UE may not be changed frequently. Accordingly, a long battery life time such as 10 to 15 years may be required.

URLLC is a mission-critical cellular-based wireless communication service. For example, a remote control service for a robot or machinery, an industrial automation service, an unmanned aerial vehicle service, a remote heath care service, and an emergency alert service, may be considered. Therefore, communication provided by the URLLC may need to provide significantly low latency and significantly high reliability. For example, the service that supports URLLC needs to satisfy an air interface latency less than 0.5 milliseconds, as well as a packet error rate less than or equal to $10^{-5}$. Therefore, for the service that supports URLLC, a 5G system needs to provide a transmit time interval (TTI) smaller than those of other services, and in parallel, is required to allocate a wide resource in a frequency band in order to secure reliability of a communication link.

The three services interchangeably used with a 5G system, that is, eMBB, URLLC, and mMTC may be multiplexed and transmitted in a single system. In this instance, in order to satisfy different requirements of the services, transmission or reception schemes and transmission or reception parameters different among the services may be used.

FIG. 1 illustrates the basic structure of a time-frequency domain which is a wireless resource area in which data or a control channel is transmitted in a 5G system to which the disclosure is applicable.

In FIG. 1, the horizontal axis is the time domain and the vertical axis is the frequency domain. In the time and frequency domain, the basic unit of a resource is a resource element (RE) 101 which is defined by one OFDM symbol (or discrete Fourier transform spread OFDM (DFT-s-OFDM) symbol) 102 in the time axis and one subcarrier 103 in the frequency axis. $N_{sc}^{RB}$ consecutive REs (e.g., 12 REs) in the frequency may be a single resource block (RB) 104. In addition, $N_{symb}^{subframe}$ consecutive OFDM symbols in the time domain may be a single subframe 110.

Figure 2:
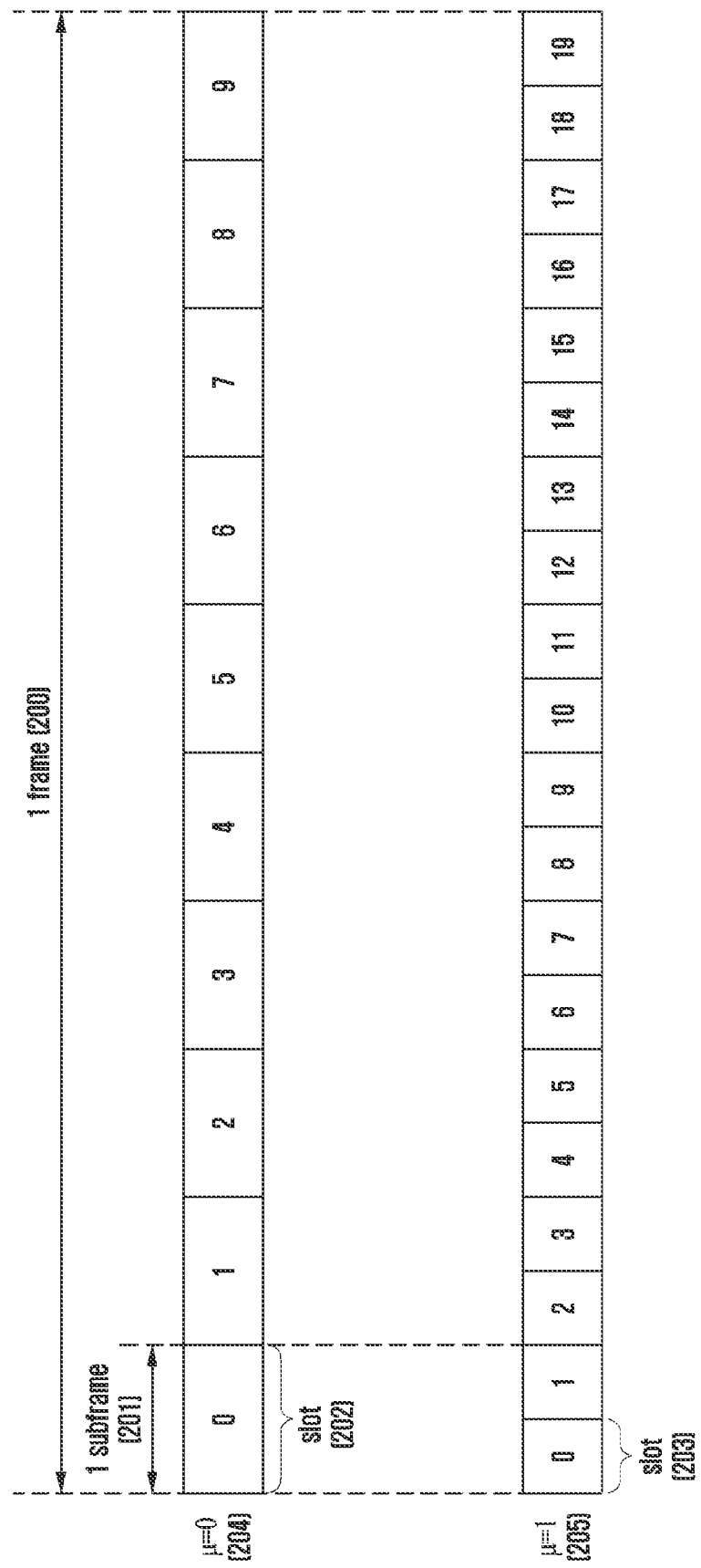
FIG. 2 illustrates a slot structure considered in the 5G system to which the disclosure is applicable.

FIG. 2 illustrates a slot structure considered in the 5G system to which the disclosure is applicable.

Referring to FIG. 2, FIG. 2 illustrates the structure of a frame 200, a subframe 201, and a slot 202. The single frame 200 may be defined as 10 ms. The single subframe 201 may be defined as 1 ms. Therefore, the one frame 200 may include a total of 10 subframes 201. In addition, a single slot 202 and 203 may be defined as 14 OFDM symbols (e.g., the number of symbols per slot ($N_{symbol}^{slot}$)=14). The one subframe 201 may include one or multiple slots 202 and 203, and the number of slots 202 and 203 per subframe 201 may differ depending on μ 204 and 205 which is a set value for a subcarrier spacing.

FIG. 2 illustrates a slot structure when a subcarrier spacing set value is μ=0 204 and a slot structure when a subcarrier spacing set value is μ=1 205. In the case of μ=0 204, the single subframe 201 may include one slot 202. In the case of μ=1 205, the single subframe 201 may include two slots 203. Depending on a set value μ for a subcarrier spacing, the number of slots per subframe $N_{slot}^{subframe,\mu}$ may differ. Accordingly, the number of slots per frame $N_{slot}^{frame,\mu}$ may also differ. $N_{slot}^{subframe,\mu}$ and $N_{slot}^{frame,\mu}$ based on a subcarrier spacing set value μ may be defined as listed in Table 1 as follows.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, a demodulation reference signal (DMRS) which is one of the reference signals in the 5G system will be described in detail.

A DMRS includes many DMRS ports, and respective ports maintain orthogonality so as not to cause interference with each other using a code division multiplexing (CDM) or FDM. The term DMRS may be replaced with another term depending on user intention and the purpose of use of a reference signal. DMRS is an example for describing the technical contents of the disclosure and helping understanding of the disclosure, but the disclosure is not limited thereto. That is, it is apparent to those skilled in the art to which the disclosure belongs that the embodiments are applicable to a reference signal that is based on the technical spirit of the disclosure.

FIG. 3 illustrates a DMRS pattern (type 1 and type 2) used for communication between a base station and a UE in the 5G system to which the disclosure is applicable.

In the 5G system, two DMRS patterns may be supported. Referring to FIG. 3, diagrams 301 and 302 correspond to DMRS type 1. Diagram 301 corresponds to a one-symbol pattern, and diagram 302 corresponds to a two-symbol pattern. DMRS type 1 is a DMRS pattern of a comb 2 structure, may include two CDM groups, and different CDM groups may be FDM'ed.

In one-symbol pattern of diagram 301 of FIG. 3, CDM on the frequency is applied to the same CDM group, and two DMRS ports may be distinguished. Accordingly, a total of 4 orthogonal DMRS ports may be configured. A DMRS port ID mapped to each CDM group is illustrated in diagram 301 (in the case of a DL, a DMRS port ID is expressed in a manner of adding +1000 to the indicated number). In two-symbol pattern of diagram 302 of FIG. 3, CDM on the time/frequency is applied to the same CDM group, and four DMRS ports may be distinguished. Accordingly, a total of 8 orthogonal DMRS ports may be configured. A DMRS port ID mapped to each CDM group is illustrated in diagram 302 (in the case of a DL, a DMRS port ID is expressed in a manner of adding +1000 to an indicated number).

DMRS type 2 in diagrams 303 and 304 is a DMRS pattern of a structure in which frequency domain orthogonal cover codes (FD-OCC) is applied to an adjacent subcarrier on the frequency, may include three CDM groups, and different CDM groups may be FDM'ed.

In one-symbol pattern of diagram 303 of FIG. 3, CDM on the frequency is applied to the same CDM group, and two DMRS ports may be distinguished. Accordingly, a total of 6 orthogonal DMRS ports may be configured. A DMRS port ID mapped to each CDM group is illustrated in diagram 303 (in the case of a DL, a DMRS port ID is expressed in a manner of adding +1000 to an indicated number). In the two-symbol pattern of diagram 304, CDM on the time/frequency is applied to the same CDM group, and four DMRS ports may be distinguished. Accordingly, a total of 12 orthogonal DMRS ports may be configured. A DMRS port ID mapped to each CDM group is illustrated in diagram 304 (in the case of a DL, a DMRS port ID is expressed in a manner of adding +1000 to an indicated number).

As described in the above, in the 5G system, two different DMRS patterns (diagrams 301 and 302 or diagrams 303 and 304) may be configured, and whether a DMRS pattern corresponds to the one-symbol pattern 301 and 303 or two-adjacent-symbol pattern 302 and 304 may also be configured. In addition, in the 5G system, a DMRS port number may be scheduled and the number of CDM groups which are scheduled together for a physical downlink shared channel (PDSCH) rate matching may be configured and signaled. In addition, in the case of cyclic prefix based OFDM (CP-OFDM), the above-described two DMRS patterns may be supported in a downlink and an uplink. In the case of a discrete Fourier transform spread OFDM (DFT-S-OFDM), only DMRS type 1 among the above-described DMRS patterns may be supported in an uplink. In addition, configuring an additional DMRS occurs is included in the foremost symbol in time, and an additional DMRS is referred to as a DMRS that comes after the front-loaded DMRS. In an NR system, the number of additional DMRSs may be set to a value in the range of 0 as the minimum limit to 3 as the maximum limit. If an additional DMRS is configured, it is assumed that the additional DMRS may have the same pattern as that of the front-loaded DMRS. More particularly, when information indicating whether the described DMRS pattern type associated with the front-loaded DMRS corresponds to type 1 or type 2, information on whether a DMRS pattern corresponds to a one-symbol pattern or a two-adjacent-symbol pattern, and information associated with the number of DMRS ports and the number of CDM groups used are indicated. If an additional DMRS is further configured, it is assumed that the additional DMRS is configured with the same DMRS information as that of the front-loaded DMRS.

Particularly, the above-described downlink DMRS and uplink DMRS configurations may be configured via an RRC signaling of Table 2 and Table 3 as shown below.

TABLE 2

```
DMRS-DownlinkConfig ::=      SEQUENCE {
    dmrs-Type (DMRS type configuration)         ENUMERATED
{type2}     OPTIONAL,   -- Need S
    dmrs-AdditionalPosition (additional DMRS OFDM symbol
```

TABLE 2-continued

```
configuration)
ENUMERATED {pos0, pos1, pos3}     OPTIONAL,  -- Need S
  maxLength (1 symbol or 2symbol DMRS pattern related configuration)
ENUMERATED {len2}   OPTIONAL,  -- Need S
  scramblingID0 (scrambling ID0)            INTEGER (0..65535)
  OPTIONAL,  -- Need S
  scramblingID1  (scrambling ID1)           INTEGER (0..65535)
OPTIONAL,  -- Need S
  phaseTrackingRS (PTRS configuration)   SetupRelease { PTRS-
DownlinkConfig } OPTIONAL,  -- Need M
  ...
}
```

TABLE 3

```
DMRS-UplinkConfig ::=              SEQUENCE {
  dmrs-Type (DMRS type configuration)                ENUMERATED
{type2}                      OPTIONAL,  -- Need S
  dmrs-AdditionalPosition (additional DMRS OFDM symbol configuration)
ENUMERATED {pos0, pos1, pos3}                    OPTIONAL,  --
Need R
  phaseTrackingRS (PTRS configuration)          SetupRelease { PTRS-
UplinkConfig }            OPTIONAL,  -- Need M
  maxLength (1 symbol or 2symbol DMRS pattern related configuration)
ENUMERATED {len2}                          OPTIONAL,  -- Need S
  transformPrecodingDisabled                 SEQUENCE {
    scramblingID0 (scrambling ID0)              INTEGER (0..65535)
OPTIONAL,  -- Need S
    scramblingID1  (scrambling ID0)             INTEGER (0..65535)
OPTIONAL,  -- Need S
    ...
  }                                          OPTIONAL,  -- Need R
  transformPrecodingEnabled                  SEQUENCE {
    nPUSCH-Identity (cell ID for DFT-s-OFDM)
INTEGER(0..1007)                           OPTIONAL,  -- Need S
    sequenceGroupHopping (sequence group hopping)      ENUMERATED
{disabled} OPTIONAL,  -- Need S
    sequenceHopping (sequence hopping)        ENUMERATED {enabled}
OPTIONAL,  -- Need S
    ...
  }                                          OPTIONAL,  -- Need R
  ...
}
```

FIG. 4 illustrates channel estimation using a DMRS received from a single PUSCH in the time domain in the 5G system to which the disclosure is applicable.

In the case of performing channel estimation for decoding data using the above-described DMRS, channel estimation may be performed within a precoding resource block group (PRG) which is a bundling unit by using PRB bundling which is associated with a system band in the frequency band. In addition, channel estimation may be performed by assuming that only DMRSs received from a single PUSCH have the same precoding in a time unit.

Figure 5:
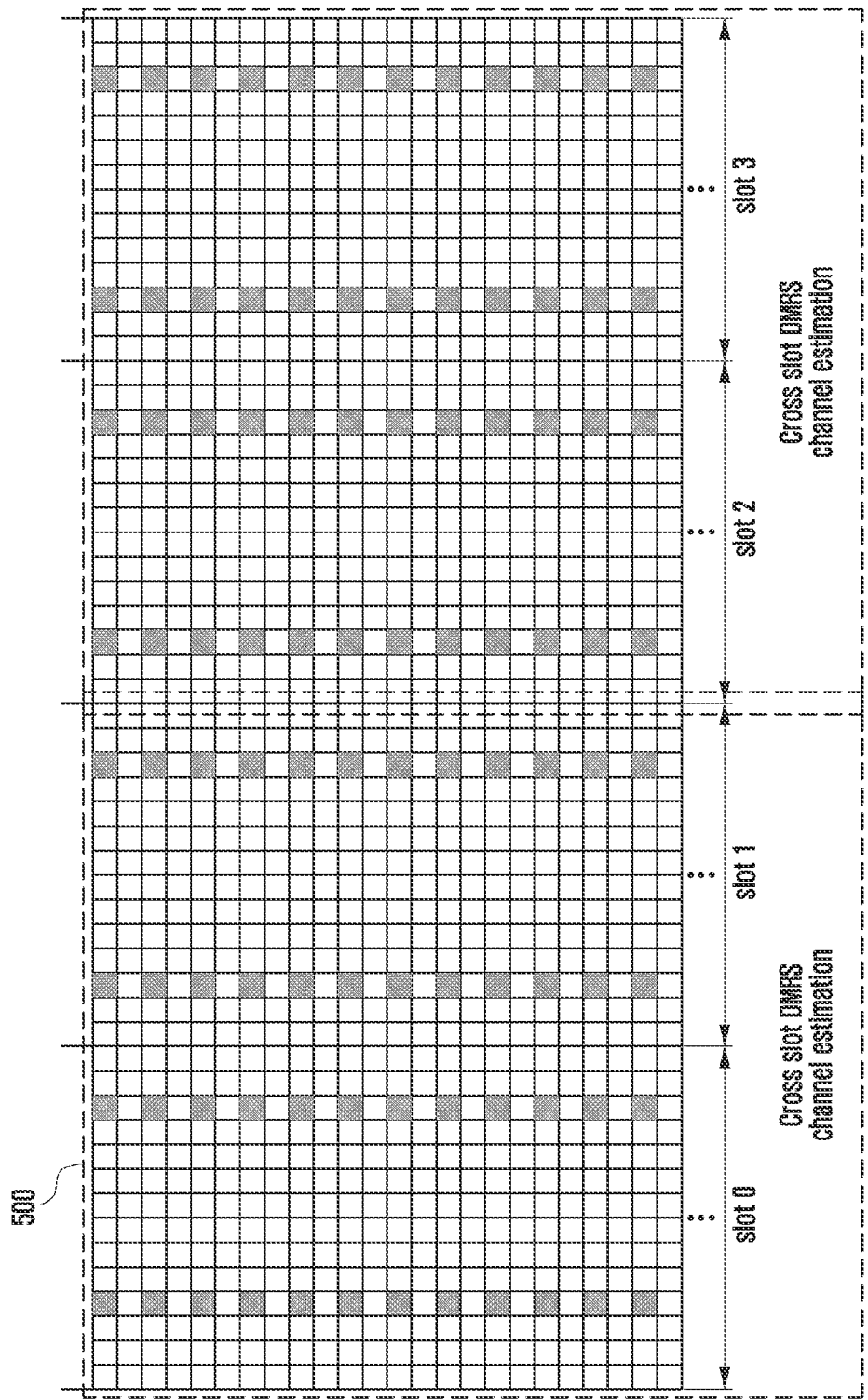
FIG. 5 illustrates joint channel estimation using a DMRS received from a plurality of PUSCHs in the time domain in the 5G system to which the disclosure is applicable.

FIG. 5 illustrates joint channel estimation using a DMRS received from a plurality of PUSCHs in the time domain in the 5G system to which the disclosure is applicable.

A base station may indicate whether a UE is to use the same precoding via a configuration, and thus, the base station may estimate a channel using DMRS transmissions that use the same precoding together and may increase channel estimation performance.

In addition, in order to perform joint channel estimation using DMRSs of a plurality of PUSCHs received from a UE, the base station may perform configuration so that the UE maintains the power consistency and phase continuity of a plurality of PUSCH transmission and transmits a plurality of PUSCHs. In the disclosure, maintaining the power consistency and phase continuity of PUSCH transmissions indicates that a plurality of PUSCH transmissions for joint channel estimation satisfies at least one of the following conditions or a combination thereof. The following conditions are merely an example, but the disclosure is not limited thereto. That is, a plurality of PUSCH transmissions for joint channel estimation may be configured to satisfy some of the following conditions, or some conditions may be modified or omitted.

1. A plurality of PUSCH transmissions for joint channel estimation should have the same modulation order.

2. A plurality of PUSCH transmissions for joint channel estimation should be assigned with the same RB. For example, the plurality of PUSCHs for joint channel estimation should be allocated to the same frequency location and should have the same number of PRBs (or the same PRB length). Alternatively, for example, inter-slot frequency hopping and intra-slot frequency hopping should not be applied to the plurality of PUSCH transmissions for joint channel estimation.

3. A plurality of PUSCH transmissions for joint channel estimation should have the same transmission power. This means that a power control parameter is the same. In addition, this indicates that dynamic transmission power of PUSCH transmission based on carrier aggregation (CA) configuration is not shared among the plurality of PUSCH transmissions for joint channel estimation.

4. A plurality of PUSCH transmissions for joint channel estimation should have the same beam configuration. For example, beam switching should not be performed among the plurality of PUSCH transmissions for joint channel estimation.

5. A downlink and another uplink transmission or reception should not be performed among a plurality of PUSCH transmissions for joint channel estimation.

If at least one of the conditions or a combination of some of the conditions is not satisfied, it is determined (or identified) that the power consistency and the phase continuity of PUSCH transmissions are not maintained.

According to the above-described conditions, the UE may apply the same modulation order, the same number of RBs, the same frequency location, the same precoding, and the same beam in order to maintain the power consistency and the phase continuity of a plurality of PUSCHs which are configured by the base station. The UE may not perform downlink and another uplink transmission or reception among the plurality of PUSCH transmissions for joint channel estimation.

As in FIG. 4, in the case of performing channel estimation for decoding data using a DMRS in FIG. 5, channel estimation may be performed within a PRG which is a bundling unit by using PRB bundling which is associated with a system band in the frequency band. In addition, channel estimation may be performed by assuming that only DMRSs received via one or more PUSCHs have the same precoding in a time unit (time window). Through the above, channel estimation based on multiple DMRSs in the time domain is allowed, and thus, channel estimation performance may be improved. Particularly, even though data decoding performance is good, channel estimation performance may be bottlenecked. Accordingly, the channel estimation performance is considered to be very importance in order to increase a coverage area.

Hereinafter, a method of allocating a time domain resource to a data channel in a 5G communication system will be described. A base station may configure a table associated with time domain resource allocation information associated with a PDSCH and a PUSCH) for a UE via higher layer signaling (e.g., RRC signaling).

The base station may configure a table including a maximum of 16 entries (maxNrofDL-Allocations=16) in association with a PDSCH and may configure a table including a maximum of 16 entries (maxNrofUL-Allocations=16) in association with a PUSCH. The time domain resource allocation information may include a PDCCH-to-PDSCH slot timing (corresponding to a slot unit-based time interval between the point in time when a PDCCH is received and the point in time when a PDSCH, scheduled by the received PDCCH, is transmitted, and being denoted by K0) or a PDCCH-to-PUSCH slot timing (corresponding to a slot unit-based time interval between the point in time when a PDCCH is received and the point in time when a PUSCH, scheduled by the received PDCCH, is transmitted, and being denoted by K2), information associated with the length and the location of a start symbol where a PDSCH or a PUSCH is scheduled in a slot, a PDSCH or PUSCH mapping type, and the like. For example, the information shown in the tables below may be reported from the base station to the UE.

TABLE 4

```
PDSCH-TimeDomainResourceAllocationList information element
PDSCH-TimeDomainResourceAllocationList      ::=       SEQUENCE
(SIZE(1..maxNrofDL-Allocations))             OF        PDSCH-
TimeDomainResourceAllocation
PDSCH-TimeDomainResourceAllocation ::=    SEQUENCE {
   k0                                        INTEGER(0..32)
OPTIONAL,  -- Need S
   (PDCCH-to-PDSCH timing, slot unit)
   mappingType                   ENUMERATED {typeA, typeB},
   (PDSCH mapping type)
   startSymbolAndLength          INTEGER (0..127)
   (length and start symbol of PDSCH)}
```

TABLE 5

```
PUSCH-TimeDomainResourceAllocation information element
PUSCH-TimeDomainResourceAllocationList ::=          SEQUENCE
(SIZE(1..maxNrofUL-Allocations))                    OF       PUSCH-
TimeDomainResourceAllocation
PUSCH-TimeDomainResourceAllocation ::=         SEQUENCE {
   k2                    INTEGER(0..32)     OPTIONAL,   -- Need S
   (PDCCH-to-PUSCH timing, slot unit)
   mappingType                   ENUMERATED {typeA, typeB},
   (PUSCH mapping type)
   startSymbolAndLength          INTEGER (0..127)
   (length and start symbol of PUSCH)}
```

The base station may inform the UE of one of the entries in the table associated with the time domain resource allocation information via L1 signaling (e.g., downlink control information (DCI)) (for example, providing an indication using a 'time domain resource allocation' field in DCI). Based on the DCI received from the base station, the UE may obtain the time domain resource allocation information associated with a PDSCH or PUSCH.

Hereinafter, transmission of an uplink data channel (physical uplink shared channel (PUSCH)) in the 5G system will be described in detail. PUSCH transmission may be dynamically scheduled by uplink grant in DCI or may be operated according to configured grant Type 1 or Type 2. Dynamic scheduling indication associated with PUSCH transmission may be performed based on DCI format 0_0 or 0_1.

Configured grant Type 1 PUSCH transmission may be semi-statically configured via reception of configuredGrantConfig including rrc-ConfiguredUplinkGrant of Table 6 below via higher signaling, as opposed to receiving uplink grant in DCI. Configured grant Type 2 PUSCH transmission may be semi-continuously scheduled by uplink grant in DCI after receiving configuredGrantConfig excluding rrc-ConfiguredUplinkGrant of Table 6 via higher signaling. If PUSCH transmission is operated via configured grant, parameters applied to PUSCH transmission may be applied via configuredGrantConfig which is higher signaling of Table 6, excluding dataScramblingIdentityPUSCH, txConfig, codebookSubset, maxRank, and scaling of UCI-On-PUSCH provided via pusch-Config of Table 7 below, which is higher signaling. If the UE receives transformPrecoder in configuredGrantConfig which is higher signaling of Table 6, the UE may apply tp-pi2BPSK in pusch-Config of Table 7 with respect to PUSCH transmission that operates based on configured grant.

configured grant. If the UE receives, via DCI format 0_0, an indication associated with scheduling of PUSCH transmission, the UE performs beam configuration for PUSCH transmission using pucch-spatialRelationInfoID corresponding to a UE-specific PUCCH resource corresponding

TABLE 6

```
ConfiguredGrantConfig
ConfiguredGrantConfig ::=                SEQUENCE {
    frequencyHopping                         ENUMERATED {intraSlot, interSlot}
OPTIONAL,    -- Need S,
    cg-DMRS-Configuration                DMRS-UplinkConfig,
    mcs-Table                                ENUMERATED {qam256, qam64LowSE}
OPTIONAL,    -- Need S
    mcs-TableTransformPrecoder               ENUMERATED {qam256,
qam64LowSE}                          OPTIONAL,    -- Need S
    uci-OnPUSCH                          SetupRelease { CG-UCI-OnPUSCH }
OPTIONAL,    -- Need M
    resourceAllocation                   ENUMERATED { resourceAllocationType0,
resourceAllocationType1, dynamic Switch },
    rbg-Size                                 ENUMERATED {config2}
OPTIONAL,    -- Need S
    powerControlLoopToUse                ENUMERATED {n0, n1},
    p0-PUSCH-Alpha                       P0-PUSCH-AlphaSetId,
    transformPrecoder                        ENUMERATED {enabled, disabled}
OPTIONAL,    -- Need S
    nrofHARQ-Processes                   INTEGER(1..16),
    repK                             ENUMERATED {n1, n2, n4, n8},
    repK-RV                          ENUMERATED {s1-0231, s2-0303, s3-0000}
OPTIONAL,    -- Need R
    periodicity                          ENUMERATED {
                            sym2, sym7, sym1x14, sym2x14, sym4x14,
sym5x14, sym8x14, sym10x14, sym16x14, sym20x14,
                            sym32x14, sym40x14, sym64x14, sym80x14,
sym128x14, sym160x14, sym256x14, sym320x14, sym512x14,
                            sym640x14, sym1024x14, sym1280x14,
sym2560x14, sym5120x14,
                            sym6, sym1x12, sym2x12, sym4x12, sym5x12,
sym8x12, sym10x12, sym16x12, sym20x12, sym32x12,
                            sym40x12, sym64x12, sym80x12, sym128x12,
sym160x12, sym256x12, sym320x12, sym512x12, sym640x12,
                            sym1280x12, sym2560x12
    },
    configuredGrantTimer                     INTEGER (1..64)
OPTIONAL,    -- Need R
    rrc-ConfiguredUplinkGrant                SEQUENCE {
        timeDomainOffset                     INTEGER (0..5119),
        timeDomainAllocation                 INTEGER (0..15),
        frequencyDomainAllocation                BIT STRING (SIZE(18)),
        antennaPort                      INTEGER (0..31),
        dmrs-SeqInitialization                   INTEGER (0..1)
OPTIONAL,    -- Need R
        precodingAndNumberOfLayers           INTEGER (0..63),
        srs-ResourceIndicator                INTEGER (0..15)
OPTIONAL,    -- Need R
        mcsAndTBS                        INTEGER (0..31),
        frequencyHoppingOffset                   INTEGER (1..
maxNrofPhysicalResourceBlocks–1)         OPTIONAL,    -- Need R
        pathlossReferenceIndex               INTEGER (0..maxNrofPUSCH-
PathlossReferenceRSs–1),
    ...
    }
OPTIONAL,    -- Need R
...}
```

A DMRS antenna port for PUSCH transmission may be the same as an antenna port for SRS transmission. PUSCH transmission may be performed according to a codebook-based transmission method or a non-codebook based transmission method, depending on whether the value of txConfig in pusch-Config of Table 7 which is higher signaling is codebook or nonCodebook. As described above, PUSCH transmission may be dynamically scheduled via DCI format 0_0 or 0_1 and may be semi-statically configured via to the smallest ID in an uplink BWP activated in a serving cell. In this instance, PUSCH transmission is performed based on a single antenna port. In the BWP in which a PUCCH resource including pucch-spatialRelationInfo is not configured, the UE does not expect PUSCH transmission to be scheduled via DCI format 0_0. If the UE is not configured with txConfig in pusch-Config of Table 7, the UE may not expect scheduling via DCI format 0_1.

TABLE 7

```
PUSCH-Config
PUSCH-Config ::=                          SEQUENCE {
    dataScramblingIdentityPUSCH                 INTEGER (0..1023)
OPTIONAL,   -- Need S
    txConfig                              ENUMERATED {codebook, nonCodebook}
OPTIONAL,   -- Need S
    dmrs-UplinkForPUSCH-MappingTypeA            SetupRelease { DMRS-
UplinkConfig } OPTIONAL,   -- Need M
    dmrs-UplinkForPUSCH-MappingTypeB            SetupRelease { DMRS-
UplinkConfig } OPTIONAL,   -- Need M
    pusch-PowerControl                          PUSCH PowerControl
OPTIONAL,   -- Need M
    frequencyHopping                      ENUMERATED {intraSlot, interSlot}
OPTIONAL,   -- Need S
    frequencyHoppingOffsetLists           SEQUENCE (SIZE (1..4)) OF INTEGER (1..
maxNrofPhysicalResourceBlocks-1)
OPTIONAL,   -- Need M
    resourceAllocation                    ENUMERATED { resourceAllocationType0,
resourceAllocationType1, dynamicSwitch},
    pusch-TimeDomainAllocationList              SetupRelease { PUSCH-
TimeDomainResourceAllocationList }  OPTIONAL,   -- Need M
    pusch-AggregationFactor               ENUMERATED { n2, n4, n8 }
OPTIONAL,   -- Need S
    mcs-Table                             ENUMERATED {qam256, qam64LowSE}
OPTIONAL,   -- Need S
    mcs-TableTransformPrecoder            ENUMERATED {qam256, qam64LowSE}
OPTIONAL,   -- Need S
    transformPrecoder                     ENUMERATED {enabled, disabled}
OPTIONAL,   -- Need S
    codebookSubset       ENUMERATED   {fullyAndPartialAndNonCoherent,
partialAndNonCoherent,nonCoherent}
        OPTIONAL, -- Cond codebookBased
    maxRank                               INTEGER (1..4) OPTIONAL, -- Cond
codebookBased
    rbg-Size                              ENUMERATED { config2}
OPTIONAL, -- Need S
    uci-OnPUSCH                                 SetupRelease { UCI-OnPUSCH}
OPTIONAL, -- Need M
    tp-pi2BPSK                            ENUMERATED {enabled}
OPTIONAL, -- Need S
    ...}
```

Codebook-based PUSCH transmission may be dynamically scheduled via DCI format 0_0 or 0_1 and may be semi-statically operated by configured grant. If codebook-based PUSCH transmission is dynamically scheduled by DCI format 0_1 or semi-statically configured by configured grant, the UE may determine a precoder for PUSCH transmission based on an SRS resource indicator (SRI), a transmission precoding matric indicator (TPMI), and a transmission rank (the number of PUSCH transmission layers).

In this instance, an SRI may be given by an SRS resource indicator field in DCI or may be configured according to srs-ResourceIndicator via higher signaling. In the case of codebook based PUSCH transmission, the UE may be configured with at least one SRS resource and may be configured with a maximum of two SRS resources. If the UE receives an SRI via DCI, an SRS resource indicated by the corresponding SRI may be an SRS resource corresponding to the SRI among SRS resources transmitted in advance to a PDCCH including the corresponding SRI. In addition, the TPMI and the transmission rank may be given by a precoding information and number of layers field in the DCI, or may be configured according to precodingAndNumberOfLayers via higher signaling. The TPMI is used for indicating a precoder applied to PUSCH transmission.

The precoder to be used for PUSCH transmission may be selected from an uplink codebook having as many antenna ports as the value of nrofSRS-Ports in SRS-Config via higher signaling. In the codebook-based PUSCH transmission, the UE may determine a codebook subset based on the TPMI and codebookSubset in pusch-Config via higher signaling. Based on UE capability that the UE reports to the base station, codebookSubset in pusch-Config via higher signaling may be set to one of fullyAndPartialAndNonCoherent, partialAndNonCoherent, or nonCoherent. If the UE reports partialAndNonCoherent as UE capability, the UE may not expect the value of codebookSubset via higher signaling to be set to fullyAndPartialAndNonCoherent. If the UE reports nonCoherent as UE capability, the UE may not expect the value of codebookSubset via higher signaling to be set to fullyAndPartialAndNonCoherent or partialAndNonCoherent. If nrofSRS-Ports in SRS-ResourceSet via higher signaling indicates two SRS antenna ports, the UE may not expect the value of codebookSubset which is higher signaling to be set to partialAndNonCoherent.

The UE may be configured with one SRS resource set for which the value of usage in SRS-ResourceSet via higher signaling is set to codebook, and one SRS resource in the corresponding SRS resource set may be indicated via an SRI. If many SRS resources are configured in SRS resource set for which the value of usage in SRS-ResourceSet via higher signaling is set to codebook, the UE may expect that the value of nrofSRS-Ports in SRS-Resource via higher signaling is set to be identical for all SRS resources.

The UE may transmit, to the base station, one or a plurality of SRS resources included in the SRS resource set for which the value of usage is set to codebook according to higher signaling, and the base station may select one of the SRS resources transmitted from the UE and may provide an indication so that the UE transmits PUSCH transmission using transmission beam information of the corresponding SRS resource. In this codebook-based PUSCH transmission, an SRI is used as information for selecting the index of an SRS resource and may be included in DCI. Additionally, the base station may include, in the DCI, information indicating a TPMI and a rank which are to be used by the UE for PUSCH transmission. By using an SRS resource indicated by the SRI, the UE may perform PUSCH transmission by applying a precoder indicated by a TPMI and rank indicated based on a transmission beam of the corresponding SRS resource.

Non-codebook-based PUSCH transmission may be dynamically scheduled via DCI format 0_0 or 0_1 and may be semi-statically operated by configured grant. If at least one SRS resource is configured in an SRS resource for which the value of usage in SRS-ResourceSet via higher signaling is set to nonCodebook, the UE may be scheduled for non-codebook based PUSCH transmission via DCI format 0_1.

For the SRS resource set for which the value of usage in SRS-ResourceSet via higher signaling is set to nonCodebook, the UE may be configured with one connected non-zero power CSI-RS (NZP CSI-RS) resources. The UE may perform calculation associated with a precoder for SRS transmission by measuring an NZP CSI-RS resource connected to the SRS resource set. If the difference between the last reception symbol of an aperiodic NZP CSI-RS resource connected to the SRS resource set and the first symbol of an aperiodic SRS transmission from the UE is less than 42 symbols, the UE may not expect the information associated with the precoder for SRS transmission to be updated.

If the value of resourceType in SRS-ResourceSet via higher signaling is set to aperiodic, a connected NZP CSI-RS may be indicated by an SRS request which is a field in DCI format 0_1 or 1_1. In this instance, if the connected NZP CSI-RS resource is an aperiodic NZP CSI resource, this may indicate that a connected NZP CSI-RS is present when the value of the SRS request field in DCI format 0_1 or 1_1 is not 00. In this instance, the corresponding DCI may not need to indicate cross carrier or cross BWP scheduling. If the value of the SRS request indicates that an NZP CSI-RS is present, the NZP CSI-RS may be located in a slot in which a PDCCH including the SRS request field is transmitted. In this instance, TCI states configured for a scheduled subcarrier may not be set to QCL-TypeD.

If a periodic or semi-continuous SRS resource set is configured, a connected NZP CSI-RS may be indicated via associatedCSI-RS in SRS-ResourceSet via high signaling. For Non-codebook based transmission, the UE may not expect that spatialRelationInfo via higher signaling of an SRS resource and associatedCSI-RS in SRS-ResourceSet via higher signaling are configured together.

If a plurality of SRS resources is configured, the UE may determine, based on an SRI indicated by the base station, a precoder to be applied to PUSCH transmission and a transmission rank. In this instance, the SRI may be indicated by an SRS resource indicator field in DCI or may be configured according to srs-ResourceIndicator via higher signaling. In the same manner as the above-described codebook-based PUSCH transmission, if the UE receives an SRI via DCI, an SRS resource indicated by the corresponding SRI may be an SRS resource corresponding to the SRI among SRS resources transmitted in advance to a PDCCH including the corresponding SRI. The UE may use one or a plurality of SRS resources for SRS transmission, the maximum number of SRS resources in one SRS resource set that are capable of being simultaneously transmitted in one symbol and the maximum number of SRS resources may be determined based on UE capability that the UE reports to the base station. In this instance, the SRS resources that the UE is capable of simultaneously transmitting may occupy the same RB. The UE may set one SRS port for each SRS resource. In the case of an SRS resource set for which the value of usage in SRS-ResourceSet via high signaling is set to nonCodebook, only one SRS resource set may be configured. In the case of an SRS resource for non-codebook based PUSCH transmission, a total of 4 SRS resources may be configured.

The base station may transmit one NZP CSI-RS connected to an SRS resource set to the UE. Based on a measurement result obtained when receiving the corresponding NZP CSI-RS, the UE may calculate a precoder to be used for transmission of one or multiple SRS resources in the corresponding SRS resource set. The UE may apply the calculated precoder when transmitting, to the base station, the one or multiple SRS resources in the SRS resource set for which usage is set to nonCodebook, and the base station may select one or multiple SRS resources among one or multiple received SRS resources. In this instance, in the case of non-codebook based PUSCH transmission, an SRI indicates an index that may express one or a combination of multiple SRS resources, and the SRI may be included in DCI. In this instance, the number of SRS resources indicated by an SRI that the base station transmits may be the number of transmission layers of a PUSCH. The UE may transmit a PUSCH by applying, to each layer, a precoder which is applied to SRS resource transmission.

When a UE is scheduled for PUSCH transmission via DCI format 0_1 in a PDCCH including a cyclic redundancy check (CRC) scrambled with a cell-radio network temporary identifier (C-RNTI), MCS-C-RNTI, or CS-RNTI, if the UE is configured with pusch-AggregationFactor via higher layer signaling, same symbol allocation may be applied in consecutive slots, of which the number is pusch-AggregationFactor, and PUSCH transmission may be limited to single rank transmission. For example, the UE may need to repeat same transport block (TB) in consecutive slots, of which the number is pusch-AggregationFactor, and the same symbol allocation needs to be applied for each slot. Table 8 below indicates a redundancy version applied to repetitions of PUSCH transmission for each slot. If the UE is scheduled for repetitions of PUSCH transmission in a plurality of slots via DCI format 0_1, and at least one symbol is indicated as a downlink symbol in the slots in which a PUSCH repetition is performed according to information of tdd-UL-DL-ConfigurationCommon or tdd-UL-DL-ConfigurationDedicated via higher layer signaling, the UE may not perform PUSCH transmission in a slot where the corresponding symbol is located.

TABLE 8

| $rv_{id}$ indicated by the DCI scheduling the PUSCH | $rv_{id}$ to be applied to $n^{th}$ transmission occasion | | | |
|---|---|---|---|---|
| | n mode 4 = 0 | n mode 4 = 1 | n mode 4 = 2 | n mode 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In the 5G system, two types of repetitions of uplink data channel transmission methods, that is, PUSCH repetition type A and PUSCH repetition type B, are supported. A UE may be configured with one of PUSCH repetition type A and PUSCH repetition type B via higher layer signaling.

PUSCH Repetition Type A

As described above, according to a method of allocating a time-domain resource within a single slot, the start symbol and length of an uplink data channel may be determined, and a base station may inform a UE of the number of times of repetitions of transmission via RRC signaling or L1 signaling (e.g., DCI).

Based on the number of times of repetitions of transmission received from the base station, the UE may repeatedly transmit an uplink data channel of which the start symbol and the length are identical to those of the above-configured uplink data channel, in consecutive slots. In this instance, in a slot that the base station configures for the UE as a downlink, or when at least one symbol is configured as a downlink among uplink data channel symbols configured for the UE, the UE may omit uplink data channel transmission.

PUSCH Repetition Type B

As described above, according to a method of allocating a time-domain resource within a single slot, the start symbol and length of an uplink data channel may be determined, and a base station may inform a UE of numberofrepetitions that is the number of times of repetitions of transmission via RRC signaling or L1 signaling (e.g., DCI).

First, based on the start symbol and length of the configured uplink data channel, the nominal repetition of an uplink data channel may be determined as follows. A nominal repetition indicates a symbol resource configured by the base station for a PUSCH repetition, and the UE may determine a resource capable of being used for an uplink in the configured nominal repetition. In this instance, a slot in which an $n^{th}$ nominal repetition starts is given by $$K_s + \left\lfloor \frac{S + n \cdot L}{N_{symb}^{slot}} \right\rfloor,$$

and a symbol in which the nominal repetition starts in the start slot is given by $\mod(S+n\cdot L, N_{symb}^{slot})$. A slot in which the $n^{th}$ nominal repetition ends is given by $$K_s + \left\lfloor \frac{S + (n+1) \cdot L - 1}{N_{symb}^{slot}} \right\rfloor,$$

and a symbol in which the nominal repetition ends in the last slot is given by $\mod(S+(n+1)\cdot L-1, N_{symb}^{slot})$. Here, $n=0, \ldots,$ numberofrepetitions$-1$, S denotes the start symbol of a configured uplink data channel, and L denotes the symbol length of a configured uplink data channel. $K_s$ denotes a slot in which PUSCH transmission starts, and $N_{symb}^{slot}$ denotes the number of symbols per slot.

The UE determines an invalid symbol for PUSCH repetition type B. A symbol configured as a downlink via tdd-UL-DL-ConfigurationCommon or tdd-UL-DL-ConfigurationDedicated may be determined as an invalid symbol for PUSCH repetition type B. In addition, an invalid symbol may be set based on a higher layer parameter (e.g., InvalidSymbolPattern). For example, an invalid symbol may be set by providing a symbol level bitmap occupying a single slot or two slots via the higher layer parameter (e.g., InvalidSymbolPattern). 1 in the bitmap may indicate an invalid symbol. In addition, the period and the pattern of the bitmap may be set via a higher layer parameter (e.g., periodicityAndPattern). If the higher layer parameter (e.g., InvalidSymbolPattern) is set and InvalidSymbolPatternIndicator-ForDCIFormat0_1 or InvalidSymbolPatternIndicator-ForDCIFormat0_2 parameter indicates 1, the UE applies an invalid symbol pattern. If the parameter indicates 0, the UE may not apply an invalid symbol pattern. If the higher layer parameter (e.g., InvalidSymbolPattern) is set and InvalidSymbolPatternIndicator-ForDCIFormat0_1 or InvalidSymbolPatternIndicator-ForDXCIFormat0_2 parameter is not set, the UE may apply an invalid symbol pattern.

UE determines an invalid symbol in each nominal repetition, and considers, as valid symbols, symbols remaining after excluding the determined invalid symbols. If each nominal repetition includes one or more valid symbols, the nominal repetition may include one or more actual repetitions. Each actual repetition indicates a symbol actually used for a PUSCH repetition among the symbols configured as the configured nominal repetition, and a set of consecutive valid symbols that are capable of being used for PUSCH repetition type B may be included in a single slot. Excluding when the symbol length of a configured uplink data channel is L=1, if an actual repetition having a single symbol is set to valid, the UE may omit actual repetition transmission.

Figure 6:
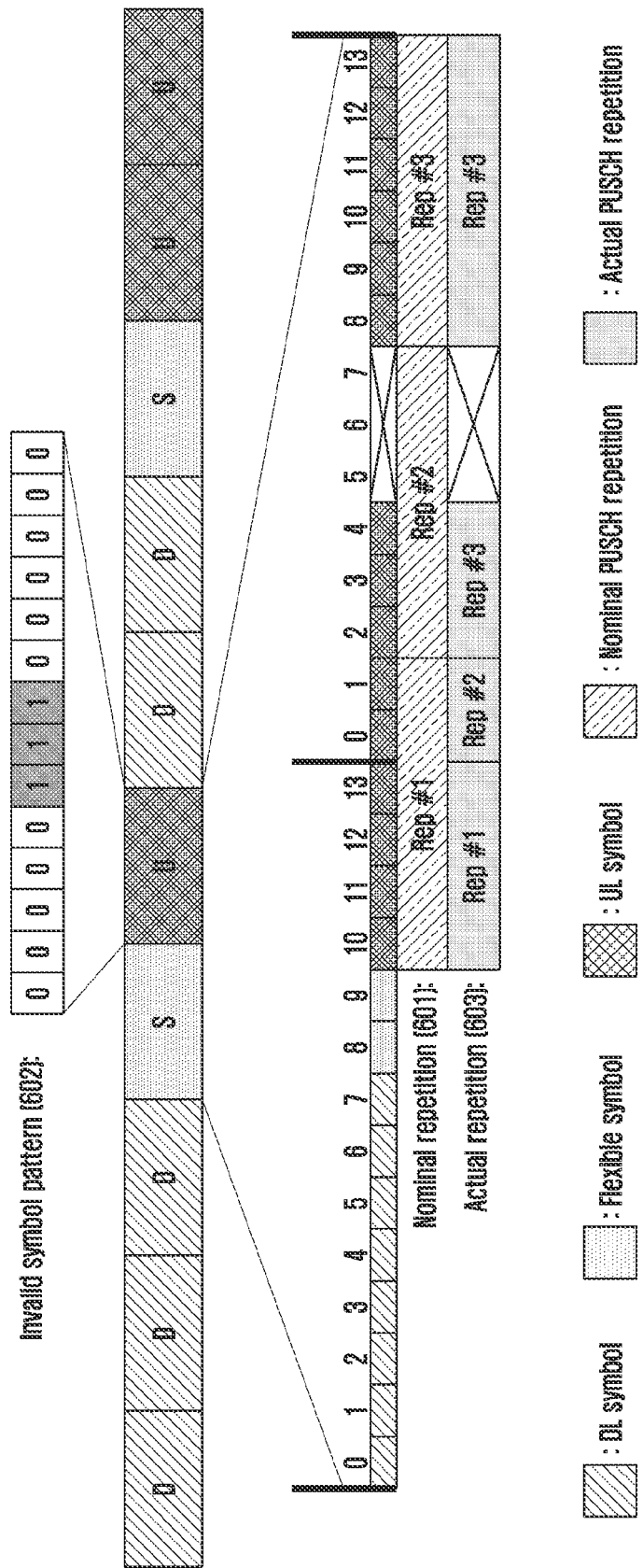
FIG. 6 illustrates PUSCH repetition type B in the 5G system to which the disclosure is applicable.

FIG. 6 illustrates PUSCH repetition type B in the 5G system to which the disclosure is applicable.

Referring to FIG. 6, when configuration is performed for a UE such that the start symbol S of an uplink data channel is set to 10, the length L is set to 6, and the number of times of repetitions of transmission is set to 3, a nominal repetition 601 appears in three consecutive slots. To determine an invalid symbol, the UE determines, as an invalid symbol, a symbol configured as a downlink symbol in each nominal repetition, and may determine, as invalid symbols, symbols that are set to 1 in an invalid symbol pattern 602. If one or more consecutive valid symbols, as opposed to invalid symbols, are configured in a single slot in each nominal repetition, the UE may configure an actual repetition 603 including one or more consecutive symbols in the single slot.

In the 5G system, two methods of frequency hopping of an uplink data channel may be supported for each PUSCH repetition type. An intra-slot frequency hopping and inter-slot frequency hopping may be supported in PUSCH repetition type A. An inter-repetition frequency hopping and an inter-slot frequency hopping may be supported in PUSCH repetition type B.

The intra-slot frequency hopping method supported in the PUSCH repetition type A may be when a UE changes a resource allocated in the frequency domain by a set frequency offset at two hops in a single slot, and transmits the same. In the intra-slot frequency hopping, the start RB of each hop may be expressed by Equation (1), as follows.

$$RB_{start} = \begin{cases} RB_{start} & i = 0 \\ (RB_{start} + RB_{offset}) \mod N_{BWP}^{size} & i = 1 \end{cases} \quad (1)$$

In Equation (1), i=0 and i=1 denote a first hop and a second hop, respectively, and $RB_{start}$ denotes a start RB in an uplink BWP and is calculated according to a frequency resource allocation method. $RB_{offset}$ denotes a frequency offset between two hops and is indicated by a higher layer parameter. The number of symbols of the first hop may be expressed as $\lfloor N_{symb}^{PUSCH,s}/2 \rfloor$, and the number of symbols of the second hop may be expressed as $N_{symb}^{PUSCH,s}-$ $\lfloor N_{symb}^{PUSCH,s}/2 \rfloor$. $N_{symb}^{PUSCH,s}$ is the length of PUSCH transmission in a single slot, and may be expressed as the number of OFDM symbols.

Subsequently, the inter-slot frequency hopping method supported in PUSCH repetition type A and B is a method in which a UE changes, by a set frequency offset, a resource allocated in the frequency domain for each slot, and transmits the same. In the inter-slot frequency hopping, a start RB in $n_s^\mu$ slots may be expressed by Equation (2), as follows.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (2)$$

In Equation (2), $n_s^\mu$ denotes the current slot number in multi-slot PUSCH transmission, and $RB_{start}$ denotes a start RB in an uplink BWP and is calculated according to a frequency resource allocation method. $RB_{offset}$ denotes a frequency offset between two hops, and is indicated by a higher layer parameter.

Subsequently, the inter-repetition frequency hopping method supported in PUSCH repetition type B is a method of shifting, by a set frequency offset, a resource allocated in the frequency domain for one or multiple actual repetitions in each nominal repetition, and performing transmission. $RB_{start}(n)$ which is the index of a start RB for one or multiple actual repetitions in an $n^{th}$ nominal repetition may be as given in Equation (3) below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (3)$$

In Equation (3), n denotes the index of a nominal repetition, and $RB_{offset}$ denotes an RB offset between two hops and is indicated by a higher layer parameter.

PUSCH transmission power may be determined by Equation (4), as follows.

$$P_{PUSCH}(i, j, q_d, l) = \quad (4)$$

$$\min \begin{Bmatrix} P_{CMAX,f,c}(i), \\ P_{0_{PUSCH},b,f,c}(j) + 10 \log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

In Equation (4), $P_{CMAX,f,c}(i)$ denotes the maximum transmission power set for the UE with respect to carrier f of serving cell c at a PUSCH transmission point i. $P_{0_{PUSCH},b,f,c}(i)$ is a reference transmission power set value based on an activated uplink bandwidth part (BWP) b of carrier f of serving cell c, and may be differ depending on a transmission type j, i.e., whether PUSCH transmission corresponds to message 3 PUSCH for random access, whether a PUSCH is a configured grant PUSCH, or whether a PUSCH is a scheduled PUSCH. $M_{RB,b,f,c}^{PUSCH}(i)$ denotes the magnitude of a frequency to which a PUSCH is allocated. $\alpha_{b,f,c}(i)$ denotes a compensation rate for a path loss of an uplink BWP b of carrier f of serving cell c, may be set by a higher signal, and may differ depending on j. $PL_{b,f,c}(q_d)$ is a downlink pathloss estimated value of an uplink BWP b of carrier f of serving cell c and may use a value measured via a reference signal in an active downlink bandwidth. The reference signal may be an SS/PBCH block or a CSI-RS. A downlink pathloss may be calculated according to Equation (3) as described above. Alternatively, $PL_{b,f,c}(q_d)$ is a downlink pathloss value, which is calculated by the UE according to Equation (3). The UE may calculate a pathloss based on a reference signal resource associated with a CSI-RS or an SS/PBCH block, depending on whether a higher signal is configured. As the reference signal resource, one may be selected from various reference signal resource sets via a higher signal or an L1 signal, and the UE may calculate a pathloss based on the reference signal resource. $\Delta_{TF,b,f,c}(i)$ is a value determined by an MCS value of a PUSCH at a PUSCH transmission point i of an uplink BWP b of carrier f of serving cell c. $f_{b,f,c}(i,l)$ is a power control adaptive value, and may dynamically control a power value based on a transmission power control command (TPC command). The TPC command is classified as an accumulated mode and an absolute mode and may be determined as one of the two modes by a higher signal. The accumulated mode is provided in a form in which a currently determined power control adaptive value is accumulated to a value indicated by a TPC command, may be increased or decreased based on the TPC command, and may have a relationship of $f_{b,f,c}(i, l) = f_{b,f,c}(i-i_0, l) + \Sigma \delta_{PUSCH,b,f,c}$. $\delta_{PUSCH,b,f,c}$ is a value indicated by the TPC command. In an absolute mode, a value may be determined by a TPC command, irrespective of the currently determined power control adaptive value, and has a relationship of $f_{b,f,c}(i,l) = \delta_{PUSCH,b,f,c}$. Table 9 below shows values indicated by a TPC command.

TABLE 9

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

In this instance, a TPC command may be transmitted to a UE via a UE-specific DCI or a group common DCI. Therefore, a base station may dynamically control transmission power of the UE via the TPC command.

Hereinafter, a method of performing configuration for joint channel estimation when a PUSCH repetition is configured in the 5G communication system to which the disclosure is applied.

When repetitions of PUSCH transmission are performed, joint channel estimation may be used for increasing the performance of channel estimation and for increasing the coverage area of a channel. In order to effectively perform joint channel estimation for repetitions of PUSCH transmission that the base station receives, the UE may need to maintain the phase continuity and the consistency of PUSCH transmission power among repetitions of PUSCH transmission to which joint channel estimation is to be performed. In addition, repetitions of PUSCH transmission need to be performed via the same beam.

For join channel estimation when repetitions of PUSCH transmission are performed in the 5G system to which the disclosure is applicable, a method of controlling a PUSCH repetition will be provided. For example, a method of controlling PUSCH transmission power for joint channel estimation, a method of determining the phase continuity in repetitions of PUSCH transmission, and a method of setting a beam may be provided. A base station may perform joint channel estimation for optimized PUSCH repetition, thereby obtaining an accurate channel estimation result. Accordingly, an uplink coverage area may be improved. Although a PUSCH repetition is described as an example herein, the disclosure is not limited thereto. That is, the disclosure may also be applicable even when a PUSCH repetition is defined/configured in advance, or when a PUSCH/PUCCH is repeatedly transmitted via signaling between a base station and a UE. In addition, in a method of controlling repetitions of PUSCH transmission for joint channel estimation, a value defined/configured in advance or a value configured via signaling between a base station and a UE may be set as one of a symbol/slot length, a gap between PUSCH/PUCCH transmissions, the number of PUSCH/PUCCH transmissions, a time-domain window (ms) in the time domain, and the like, or a combination thereof. In addition, the value set for the consistency of PUSCH transmission power and phase continuity may be defined/configured based on a subcarrier spacing.

First Embodiment

The first embodiment of the disclosure may provide a method and apparatus for controlling PUSCH transmission power for joint channel estimation for repetitions of PUSCH transmission.

However, embodiments of the disclosure may be applicable to PUSCH repetition type A, a PDSCH, and a physical sidelink shared channel (PSSCH).

Figure 7:
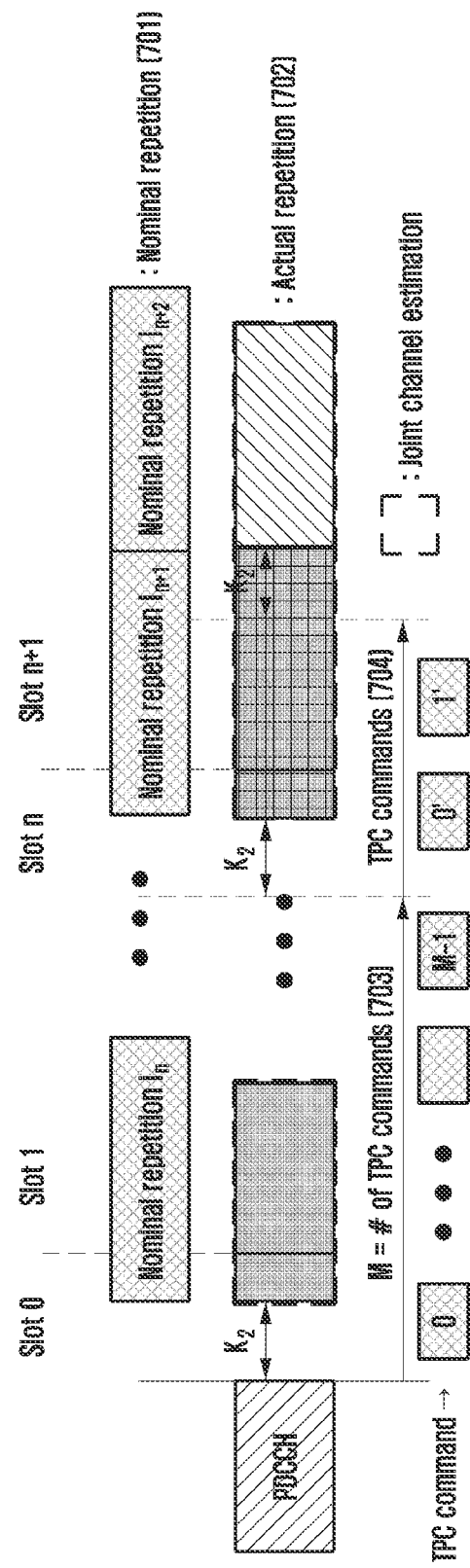
FIG. 7 illustrates a method of setting PUSCH transmission power for joint channel estimation in PUSCH repetition type B according to an embodiment.

FIG. 7 illustrates a method of setting PUSCH transmission power for joint channel estimation in PUSCH repetition type B according to an embodiment.

Referring to FIG. 7, a change of PUSCH transmission power is shown according to TPC commands 703 and 704 when a PUSCH repetition is configured and a PUSCH is transmitted via an actual repetition 702 according to a slot boundary and a nominal repetition 701. PUSCH transmission power is set via higher layer signaling or L1 signaling, and $f_{b,f,c}(i,l)=f_{b,f,c}(i-i_0,l)+\Sigma\delta_{PUSCH,b,f,c}$ is applied as a TPC command for each nominal repetition $i_n$. $\delta_{PUSCH,b,f,c}$ is a value indicated by the TPC command. Therefore, a UE may perform transmission using different PUSCH transmission powers for three different patterns of actual repetitions. In this instance, if a base station performs joint channel estimation with respect to continuous repetitions of PUSCH transmission, the consistency of PUSCH transmission power is not maintained and channel estimation performance may deteriorate. Hereinafter, the disclosure provides methods of controlling the consistency of transmission power of repetitions of PUSCH transmission for joint channel estimation, and a method may be determined as one or a combination of at least one of the following methods.

Method 1

If a base station configures, for a UE, joint channel estimation for repetitions of PUSCH transmission via higher layer signaling or L1 signaling, the UE may maintain (or set or identify) the same transmission power for all repetitions of PUSCH transmission. For example, if configuration is performed so that numberofrepetitions=n via higher layer signaling or L1 signaling, the UE may maintain $P_{PUSCH}(i_{n-1},j,q_d,l)=P_{PUSCH}(i_0,j,q_d,l)$ as power of repetitions of PUSCH transmission. In this instance, the base station and the UE may not need to perform an additional and complex operation, and the base station may perform joint channel estimation for repetitions of PUSCH transmission.

Method 2

A base station may perform scheduling by distinguishing a group of UEs for performing joint channel estimation and UEs for performing normal operation. For example, the UE may obtain $\delta_{PUSCH,b,f,c}=0$ from group-common DCI including a CRC which is for setting joint channel estimation and is scrambled with TPC-PUSCH-RNTI (or TPC-PUCCH-RNTI, TPC-SRS-RNTI).

Method 3

Method 3 provides a method of controlling PUSCH transmission power using a variable set via a higher layer signaling or L1 signaling for joint channel estimation for repetitions of PUSCH transmission.

Figure 8:
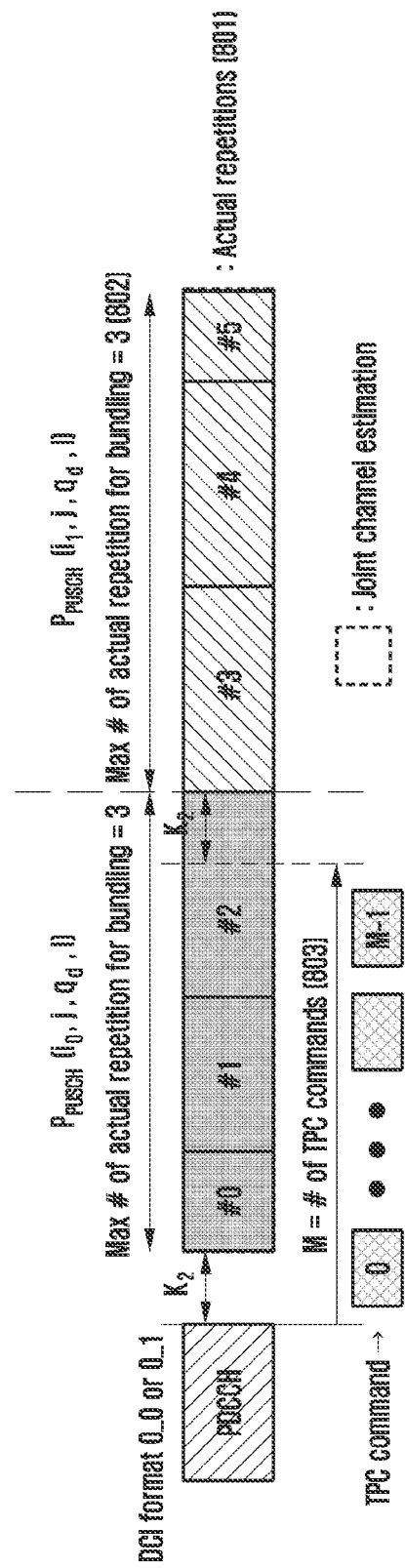
FIG. 8 illustrates a method of setting PUSCH transmission power using a value for joint channel estimation in PUSCH repetition type B according to an embodiment.

FIG. 8 illustrates a method of setting PUSCH transmission power using a value for joint channel estimation in PUSCH repetition type B according to an embodiment.

Particularly, FIG. 8 illustrates a method of controlling power of repetitions of PUSCH transmission when PUSCH repetition type B is configured and the maximum number of actual repetitions, as the range of joint channel estimation for repetitions of PUSCH transmission, is set to 3 via higher layer signaling and L1 signaling. If configuration is performed so that max number of actual repetitions=3 802, a base station may perform joint channel estimation with respect to actual repetition #0, #1, and #2, and then may perform joint channel estimation with respect to actual repetitions #3, #4, and #5. In this instance, based on an actual repetition unit for which joint channel estimation is to be performed, $P_{PUSCH}(i_0, j, q_d, l)$ is set for actual repetitions #0, #1, and #2 and $P_{PUSCH}(i_1, j, q_d, l)$ is set for actual repetitions #3, #4, #5, so that PUSCH transmission power may be controlled. If Max #of actual repetitions= $N_{Actual}^{Joint, CE}$, configuration may be performed using the TPC command 803 so that $$i = \left\lfloor \frac{n}{N_{Actual}^{Joint,CE}} \right\rfloor$$

and $f_{b,f,c}(i,l)=f_{b,f,c}(i-1,l)+\Sigma_{m=0}^{M-1}\delta_{PUSCH}(m,l)$. In this instance, $N_{Actual}^{Joint\ CE}$ may be configured for the UE for joint channel estimation via higher layer signaling and L1 signaling.

Accordingly, the same transmission power may be maintained among actual repetitions for joint channel estimation, and a closed loop power control (CLPC) based on a TPC command may be applied for each actual repetition unit for which joint channel estimation is to be performed. In this instance, the same redundancy version, precoding, modulation order, PRB, and the like may be set based on an actual repetition set (e.g., (#0, #1, #2), or (#3, #4, #5) for which joint channel estimation is to be performed.

Figure 9:
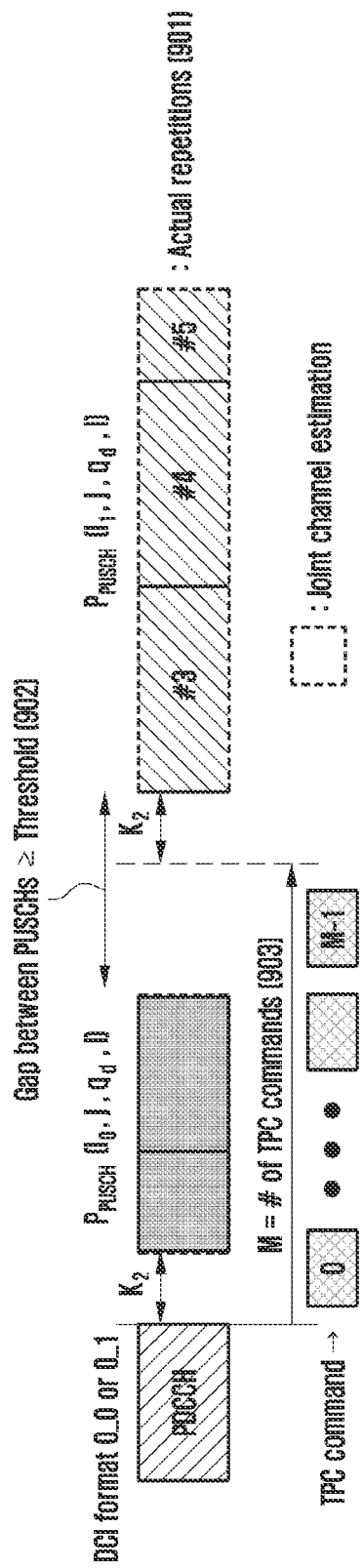
FIG. 9 illustrates a method of setting PUSCH transmission power using a value for joint channel estimation in PUSCH repetition type B according to an embodiment.

FIG. 9 illustrates a method of setting PUSCH transmission power using a value for joint channel estimation in PUSCH repetition type B according to an embodiment.

Particularly, FIG. 9 illustrates a method of controlling PUSCH transmission power for joint channel estimation when PUSCH repetition type B and a gap between actual repetitions are configured via higher layer signaling and L1 signaling.

If the gap, configured by higher layer signaling and L1 signaling, between actual repetitions 901 is greater than a threshold 902, a UE may perform transmission by setting different PUSCH transmission powers. In this instance, when a TPC command 903 is configured, if a gap between PUSCHs≥Threshold, $f_{b,f,c}(i,l)=f_{b,f,c}(i-1,l)+\Sigma_{m=0}^{M-1}\delta_{PUSCH}(m,l)$. If a gap between PUSCHs<Threshold, $f_{b,f,c}(i,l)=f_{b,f,c}(i_0, l)$.

Accordingly, the same transmission power may be maintained between actual repetitions for joint channel estimation, and TPC command-based CLPC may be applied for each actual repetition unit that is determined based on a gap and for which joint channel estimation is performed. In this instance, the same redundancy version, precoding, modulation order, PRB, and the like may be set for an actual repetition set for which joint channel estimation is performed.

In addition, based on the information configured by the base station, the UE may apply the same precoding, modulation order, PRB, and the like to an actual repetition set for which joint channel estimation is to be performed. In addition, the UE may apply the same redundancy version to a plurality of PUSCH transmissions for which joint channel estimation is to be performed for symbol unit-based decoding (I/Q combining). Alternatively, the UE may map/allocate the same redundancy version to a plurality of PUSCH transmissions for which joint channel estimation is to be performed for bit unit-based decoding (log-likelihood ratio (LLR) combining) or may perform mapping/allocation according to a redundancy version index configured by the base station. In addition, the base station may perform configuration so that the same modulation order and frequency location are used to maintain the phase continuity. In addition, based on the information configured by the base station, the UE may omit or limit another uplink transmission and downlink transmission among PUSCH transmissions for which joint channel estimation is performed.

In the above-description, a variable configured via higher layer signaling and L1 signaling for joint channel estimation is merely an example, the disclosure is not limited thereto. For example, at least one of the length of symbol/slot and the number of nominal repetitions/actual repetitions may be configured as a variable via higher layer signaling and L1 signaling. In addition, this may be applied by using one or a combination thereof. In the method, the base station may adjust a variable configured for joint channel estimation by considering a channel state and the capacity of a memory for channel estimation. Accordingly, joint channel estimation for optimized PUSCH repetition is allowed, and thus, accurate channel estimation may be performed and the coverage of a channel may be increased.

In addition, a value set for the consistency of PUSCH transmission power and the phase continuity may be defined/set based on a subcarrier spacing. For example, if a time-domain window in the time domain that satisfies the consistency of PUSCH transmission power and the phase continuity is set to 2 ms and a subcarrier spacing is set to 15 kHz, a value for joint channel estimation may be determined to be/set to a maximum (Max) number of slots=2 (e.g., Max number of slot may be determined to be/set to 2 among values for joint channel estimation). In this instance, joint channel estimation may be performed with respect to two slots. Alternatively, if a time-domain window in the time domain is set to 2 ms and a subcarrier spacing is set to 30 kHz, a value for joint channel estimation may be determined to be/set to Max number of slots=4 (e.g., Max number of slot may be determined to be/set to 4 among values for joint channel estimation). In this instance, joint channel estimation may be performed with respect to four slots. In the same manner as described above, a value set for the consistency of PUSCH transmission power and the phase continuity may be defined/set based on a subcarrier spacing.

Method 4

Method 4 provides a method of controlling transmission power for repetitions of PUSCH transmission for joint channel estimation when a PUSCH repetition and frequency hopping are configured.

Figure 10:
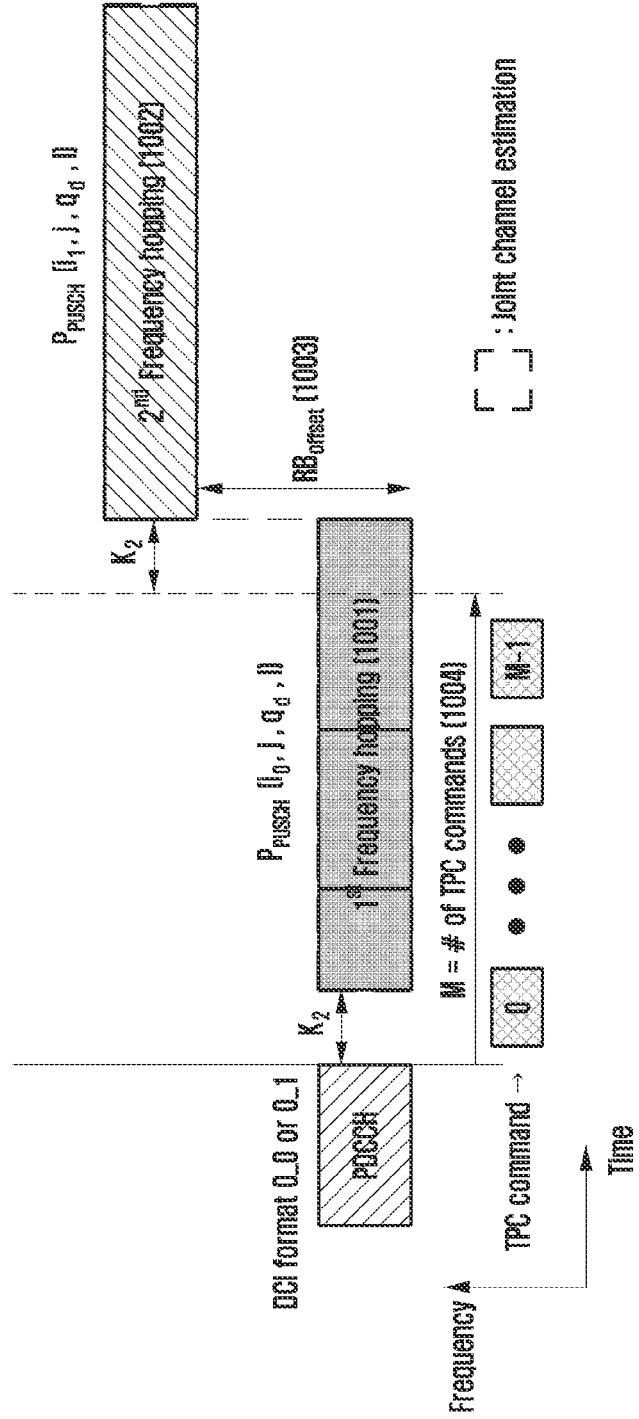
FIG. 10 illustrates a method of setting PUSCH transmission power for joint channel estimation when a PUSCH repetition and frequency hopping are configured according to an embodiment.

FIG. 10 illustrates a method of setting PUSCH transmission power for joint channel estimation when a PUSCH repetition and frequency hopping are configured according to an embodiment.

Referring to FIG. 10, if a PUSCH repetition and frequency hopping are configured via higher layer signaling and L1 signaling, a UE may perform time-frequency mapping with respect to a first frequency hop ($1^{st}$ frequency hop) 1001 and a second frequency hop ($2^{nd}$ frequency hop) 1002 for joint channel estimation using an $RB_{offset}$ 1003 for the configured frequency hopping. In this instance, the UE may perform PUSCH transmission by setting $P_{PUSCH}(i_0, j, q_d, l)$ for $1^{st}$ frequency hop 1001 and setting $P_{PUSCH}(i_1, j, q_d, l)$ for $2^{nd}$ frequency hop 1002 using a TPC command 1004 received. In this instance, the UE may perform repetitions of PUSCH transmission based on PUSCH transmission power set based on the frequency hopping. Accordingly, a base station may accurately perform joint channel estimation for repetitions of PUSCH transmission, may obtain frequency diversity, and may increase the coverage of a channel.

In the method of FIG. 10, the same transmission power may be maintained among actual repetitions for joint channel estimation, and TPC command-based CLPC may be applied for each actual repetition unit that is determined based on frequency hopping and for which joint channel estimation is to be performed. In this instance, the same redundancy version, precoding, modulation order, PRB, and the like may be set for an actual repetition set for which joint channel estimation is to be performed.

In addition, based on the information configured by the base station, the UE may apply the same precoding, modulation order, PRB, and the like to an actual repetition set for which joint channel estimation is to be performed. The UE may apply the same redundancy version to a plurality of PUSCH transmissions for which joint channel estimation is to be performed for symbol unit-based decoding (I/Q combining). Alternatively, the UE may map/allocate an identical redundancy version to a plurality of PUSCH transmission for which joint channel estimation is to be performed for bit unit-based decoding (LLR combining), or may perform mapping/allocation according to a redundancy version index configured by the base station. The base station may perform configuration so that an identical modulation order and an identical frequency location are used in order to maintain the continuity of a phase. Based on the information configured by the base station, the UE may omit or limit another uplink transmission and downlink transmission among PUSCH transmissions for which joint channel estimation is to be performed.

Second Embodiment

The second embodiment of the disclosure provides a method of identifying the continuity of a phase in repetitions of PUSCH transmission for joint channel estimation of the repetitions of PUSCH transmission, and a method of controlling the same.

Figure 11:
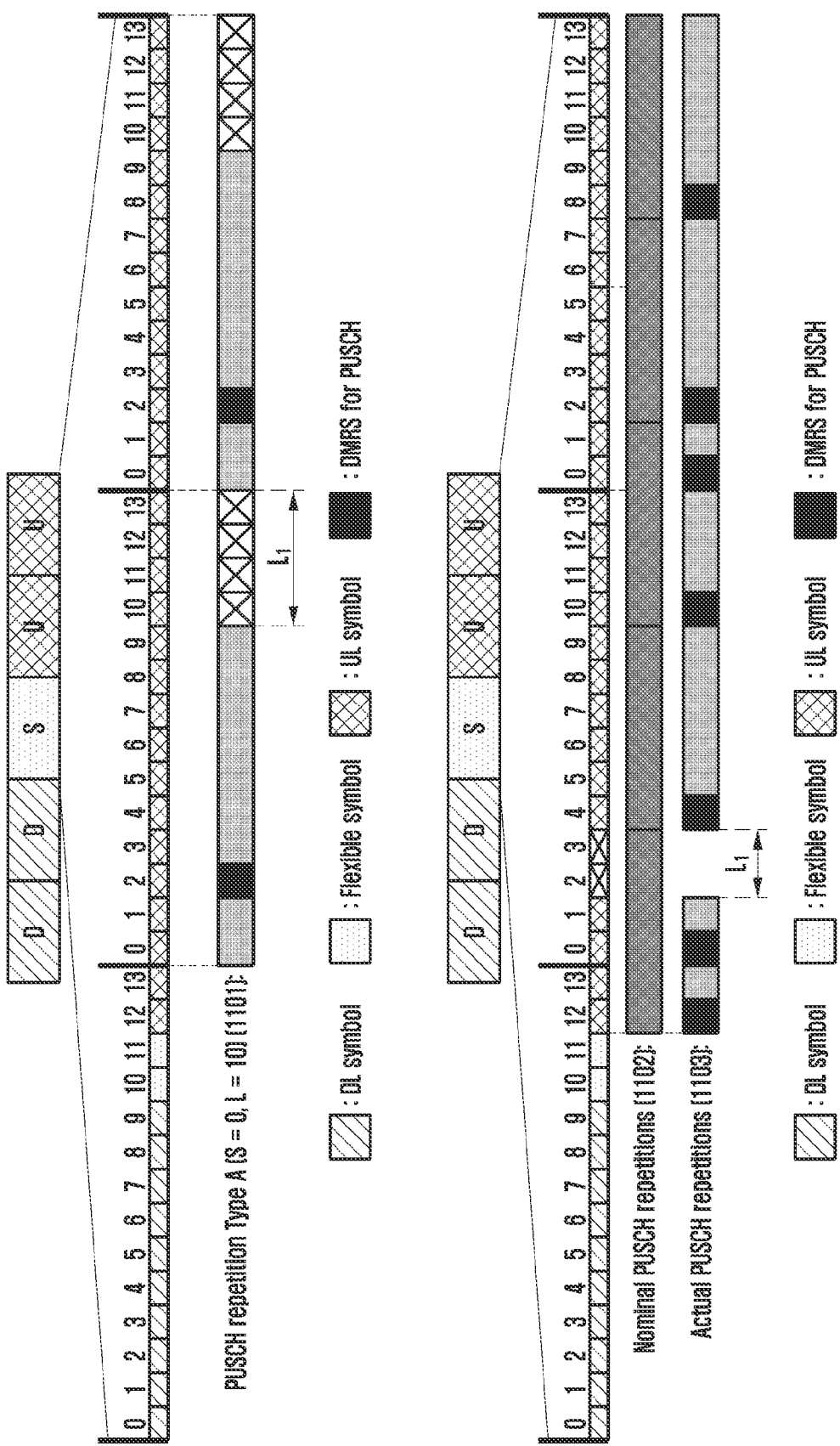
FIG. 11 illustrates discontinuous PUSCH repetitions according to a PUSCH transmission repetition configuration according to an embodiment.

FIG. 11 illustrates discontinuous PUSCH repetitions according to a PUSCH repetition configuration according to an embodiment.

Referring to FIG. 11, if PUSCH repetition type A 1101 and PUSCH repetition type B 1102 and 1103 are configured, repetitions of PUSCH transmission may be scheduled discontinuously. In this instance, in order to determine whether joint channel estimation for repetitions of PUSCH transmission is allowed, the continuity of a phase for the discontinuously scheduled PUSCH repetitions needs to be identified. This embodiment provides a method of identifying the continuity of a phase using an interval L1 between the scheduled discontinuous PUSCH repetitions.

Method 1

Method 1 is a method in which a base station determines the continuity of a phase by comparing an interval between scheduled discontinuous PUSCH repetitions and an interval between DMRSs of continuous PUSCH repetitions.

Figure 12A:
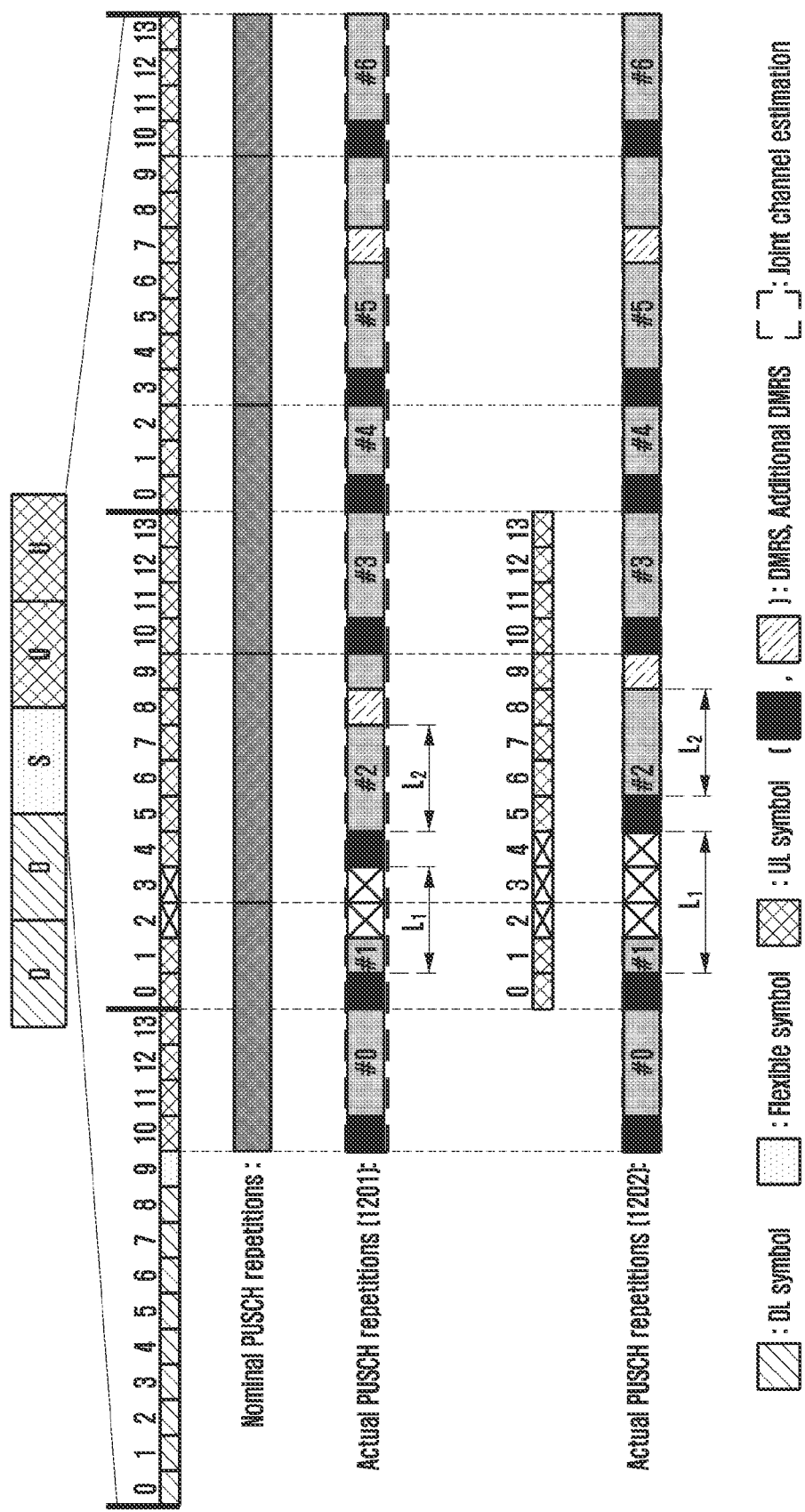
FIG. 12A illustrates a method of identifying the continuity of a phase associated with discontinuous PUSCH repetitions according to an embodiment.

FIG. 12A illustrates a method of identifying the continuity of a phase associated with discontinuous PUSCH repetitions according to an embodiment.

Referring to FIG. 12A, if PUSCH repetition type B is configured, the interval L1 between discontinuously scheduled PUSCH repetitions and the maximum interval L2 between DMRSs of continuous PUSCH repetitions may be configured. In this instance, due to two invalid symbols configured, L1=3 and L2=3 may be configured for actual repetitions 1201. If L1≤L2, a base station may determine that actual repetitions #1 and #2 have phase continuity and may perform joint channel estimation. Due to three invalid symbols configured, L1=4 and L2=3 may be configured for actual repetitions 1202. In this instance, if L1>L2, the base station may determine that actual repetitions #1 and #2 do not have phase continuity and may not perform joint channel estimation.

Method 2

Method 2 is a method in which a base station determines the continuity of a phase by comparing an interval between scheduled discontinuous PUSCH repetitions and a location where a DMRS is mapped.

Herein, if PUSCH repetition type B is configured via higher layer signaling, and pos1 is set to dmrs-Additionnal-Position in FIG. 12B, the continuity of a phase for repetitions of PUSCH transmission may be determined by comparing an interval between discontinuous PUSCH repetitions and a DMRS mapping location based on the value of pos1 marked with a broken line 1210 in FIG. 12B configured via higher layer signaling. For example, if the interval between the discontinuous PUSCH repetitions is greater than the set value of pos1, the base station may determine that discontinuous PUSCH repetitions do not have phase continuity and may not perform joint channel estimation. Alternatively, if the interval between the discontinuous PUSCH repetitions is less than or equal to the set value of pos1, the base station may determine that discontinuous PUSCH repetitions have phase continuity and may perform joint channel estimation.

Accordingly, the base station determines whether discontinuous PUSCH repetitions have phase continuity and performs joint channel estimation for the repetitions of PUSCH transmission if phase continuity is identified, and thus, accurate channel estimation may be performed and the coverage of a channel may be increased.

In the second embodiment, methods 1 and 2 of determining phase continuity for joint channel estimation may be satisfied based on the following conditions. The base station may determine in advance whether to apply the same modulation order, beam information, or precoding to PUSCH transmissions for which joint channel estimation is to be performed, and may additionally determine the continuity of a phase by considering of downlink transmission and uplink transmission among the PUSCH transmissions for which joint channel estimation is to be performed. In addition, based on information configured by the base station, the UE may apply the same modulation order, beam configuration, transmission power, frequency location, or the same number of RBs to a section for which joint channel estimation is to be performed, for PUSCH transmissions for which joint channel estimation is to be performed. In addition, the UE may omit or limit downlink transmission and another uplink transmission in the section where joint channel estimation is performed.

Third Embodiment

The third embodiment of the disclosure may provide a method of configuring a beam for joint channel estimation for repetitions of PUSCH transmission.

Figure 13:
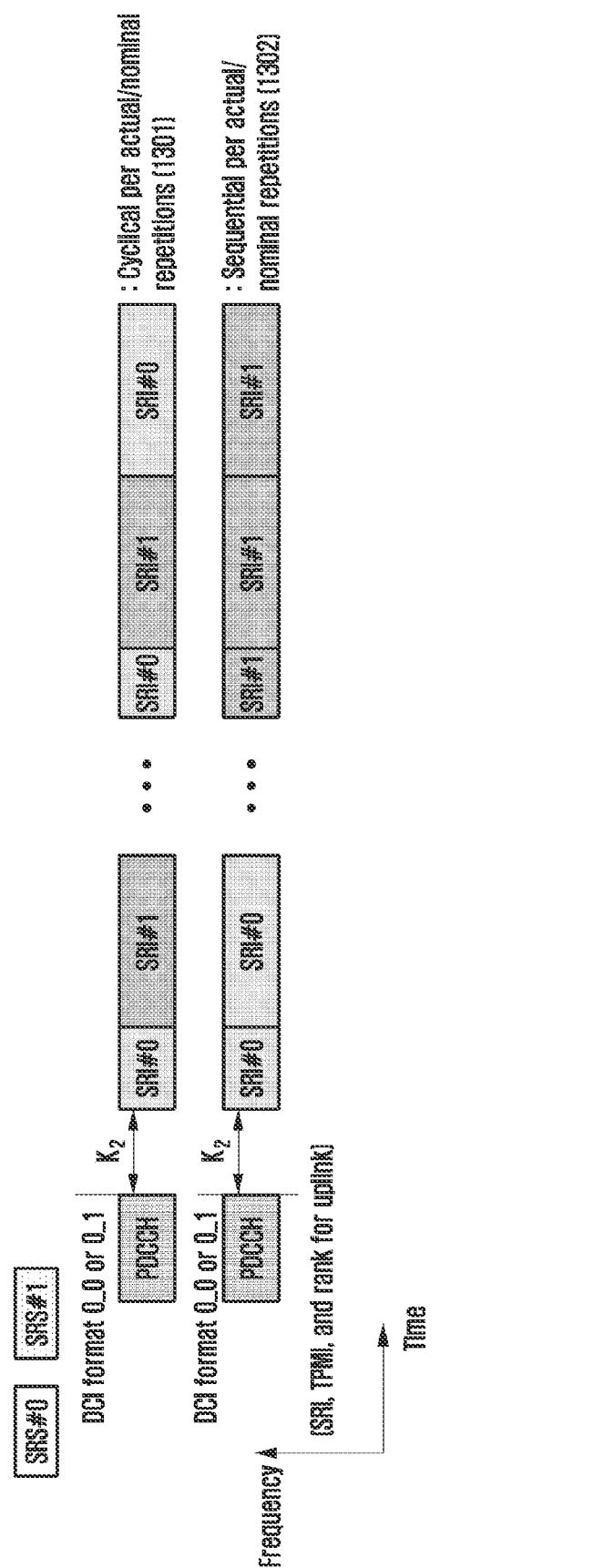
FIG. 13 illustrates beam configuration based on a PUSCH repetition configuration that considers multiple transmission and reception points (TRPs) according to an embodiment.

FIG. 13 illustrates beam configuration based on a PUSCH repetition configuration that considers multiple transmission and reception points (TRPs) according to an embodiment.

Referring to FIG. 13, when a PUSCH repetition that considers multiple TRPs is configured, cyclical mapping 1301 and sequential mapping 1302 may be configured via higher layer signaling and L1 signaling. If joint channel estimation for repetitions of PUSCH transmission is configured via higher layer signaling and L1 signaling, the same beam needs to be configured for the repetitions of PUSCH transmission for which joint channel estimation is to be performed. That is, joint channel estimation is allowed only when PUSCHs are repeatedly transmitted via the same beam.

Hereinafter, the embodiment provides a method of performing joint channel estimation for repetitions of PUSCH transmission that takes into consideration multiple TRPs.

Method 1

Method 1 is a method of performing joint channel estimation for repetitions of PUSCH transmission only when a sequential mapping method is configured for repetitions of PUSCH transmission that consider multiple TRPs.

In this instance, a base station may perform joint channel estimation for repetitions of PUSCH transmission that consider of multiple TRPs without performing an additional operation, thereby improving channel estimation performance and increasing the coverage of a channel.

Method 2

Method 2 is a method of configuring a beam for a PUSCH repetition when a cyclical mapping method is configured for a repetitions of PUSCH transmission that take into consideration multiple TRPs and a variable for joint channel estimation is configured.

Figure 14:
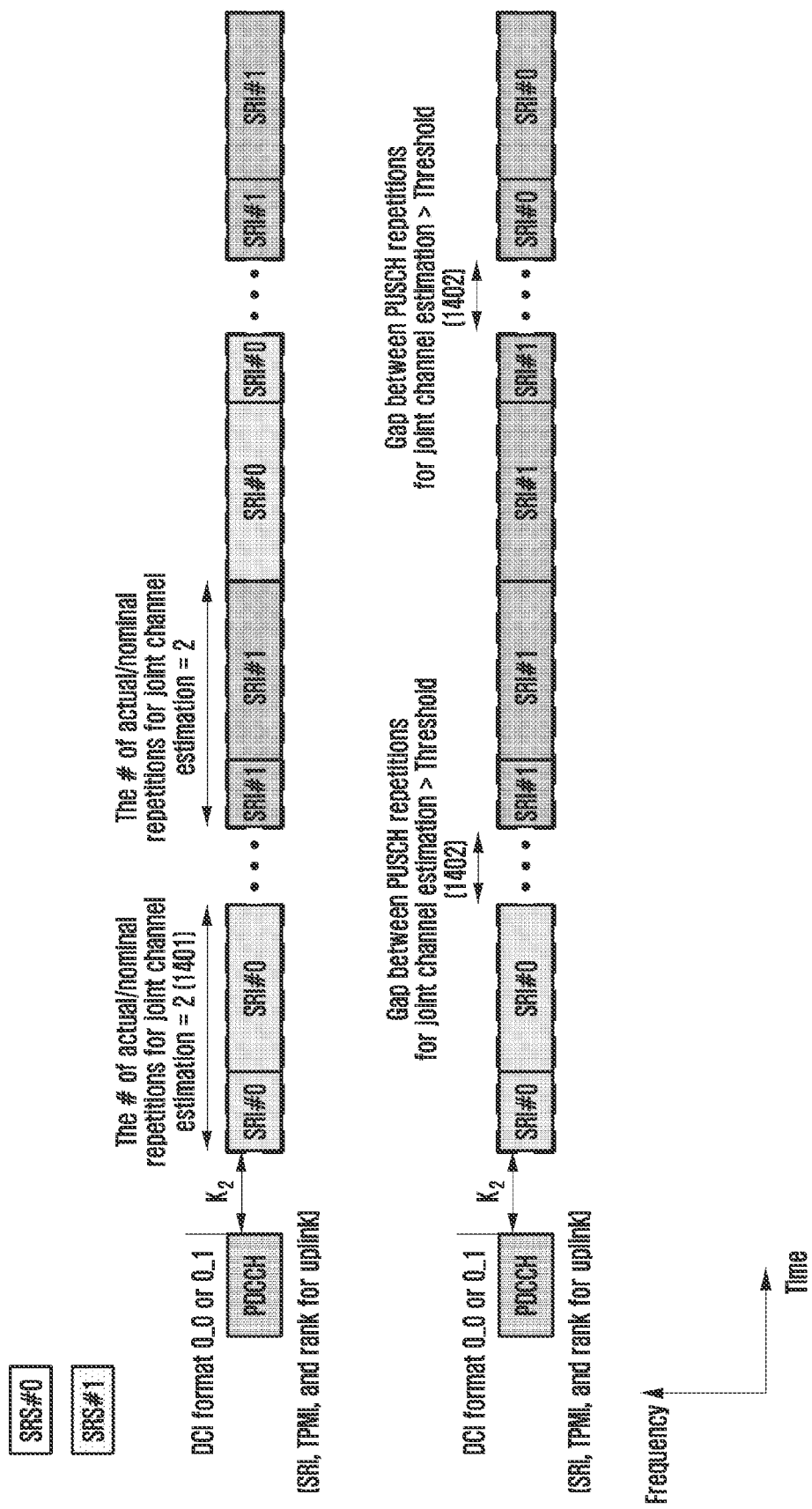
FIG. 14 illustrates a cyclical mapping method when repetitions of PUSCH transmission that consider multiple TRPs are performed, and a beam configuration method using a variable for joint channel estimation according to an embodiment.

FIG. 14 illustrates a beam configuration method using a variable for joint channel estimation and a cyclical mapping method when repetitions of PUSCH transmission that consider multiple TRPs are performed according to an embodiment.

Referring to FIG. 14, if a PUSCH repetition that considers multiple TRPs is configured for a UE, and joint channel estimation is configured, beam mapping may be performed using a variable for the configured joint channel estimation. For example, if a variable for joint channel estimation is configured as two actual repetitions 1401 for the UE via higher layer signaling and L1 signaling, the UE may consider the two actual repetitions as a single actual repetition set, may configure the same beam for the actual repetition set, and may perform cyclical beam mapping based on the actual repetition set. Alternatively, when a variable for joint channel estimation is configured, via higher layer signaling and L1 signaling, as a threshold value 1402 for an interval between repetitions of PUSCH transmission, if the interval between the repetitions of PUSCH transmission is greater than a threshold, the UE may configure different beams for the respective repetitions of PUSCH transmission, and based thereon, may perform cyclical beam mapping. In the above-description, a variable configured via higher layer signaling and L1 signaling for joint channel estimation is merely an example, the disclosure is not limited thereto. For example, at least one of the length of symbol/slot and the number of nominal repetitions/actual repetitions may be configured as a variable via higher layer signaling and L1 signaling. In addition, this may be applied by using one or a combination thereof. The UE may perform beam mapping by considering multiple TRPs and joint channel estimation, and thus, accurate channel estimation may be performed and a macro diversity gain may be obtained.

Method 3

Method 3 provides a method of mapping a beam for a PUSCH repetition that takes into consideration multiple TRPs, and a method of transmitting PUSCHs for which joint channel estimation is to be performed when frequency hopping is configured.

Figure 15:
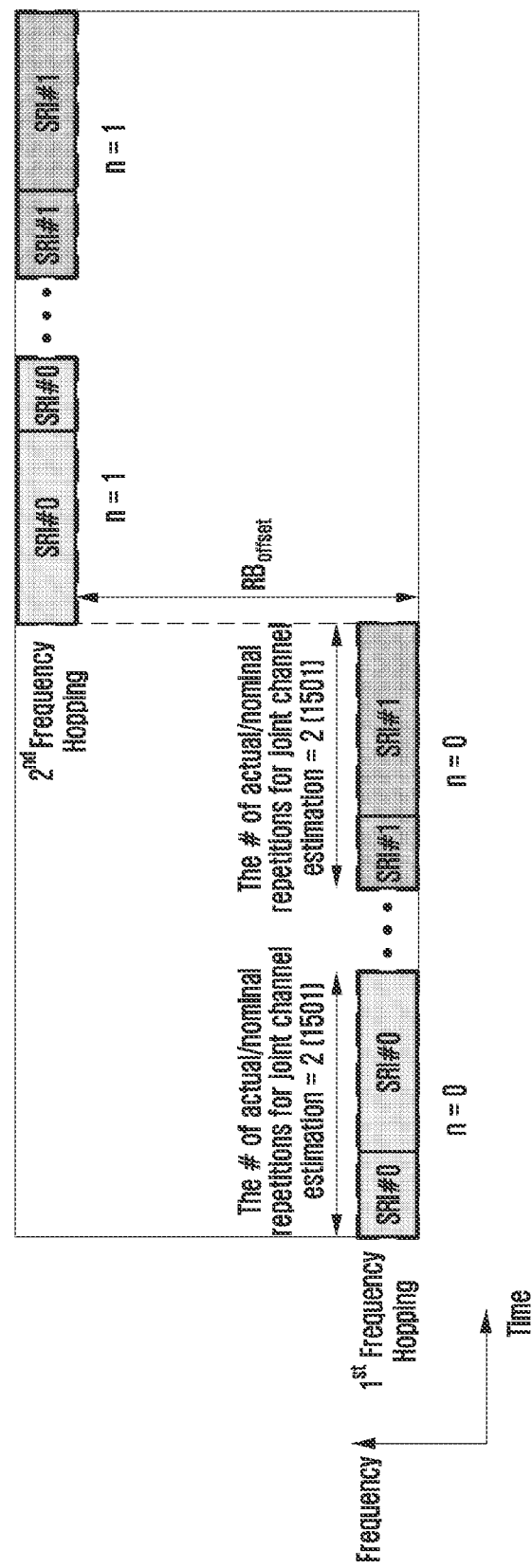
FIG. 15 illustrates a method of configuring frequency hopping when repetitions of PUSCH transmission that consider multiple TRPs are performed, and a beam configuration method using a variable for joint channel estimation according to an embodiment.

FIG. 15 illustrates a method of configuring frequency hopping when repetitions of PUSCH transmission that consider multiple TRPs are performed, and a beam configuration method using a variable for joint channel estimation according to an embodiment.

Referring to FIG. 15, when PUSCH transmission that considers multiple TRPs is performed, frequency hopping is applied for each beam in order to obtain frequency diversity for each TRP, and a beam may be mapped based on a variable 1501 for joint channel estimation configured via higher layer signaling and L1 signaling. Equation (5) below is for frequency mapping for each TRP.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (5)$$

As illustrated in FIG. 15, frequency hopping may be applied to SRI #0 and SRI #1, respectively. In the above-description, a variable configured via higher layer signaling and L1 signaling for joint channel estimation is merely an example, the disclosure is not limited thereto. For example, at least one of the length of symbol/slot and the number of nominal repetitions/actual repetitions may be configured as a variable via higher layer signaling and L1 signaling. In addition, the above-described method may be applied by using one or a combination thereof. The UE may perform frequency-beam mapping by considering multiple TRPs and joint channel estimation, and thus, accurate channel estimation may be performed and macro diversity and frequency diversity gain may be obtained.

Fourth Embodiment

The fourth embodiment of the disclosure may provide a method of controlling joint channel estimation for repetitions of PUSCH transmission.

Figure 16:
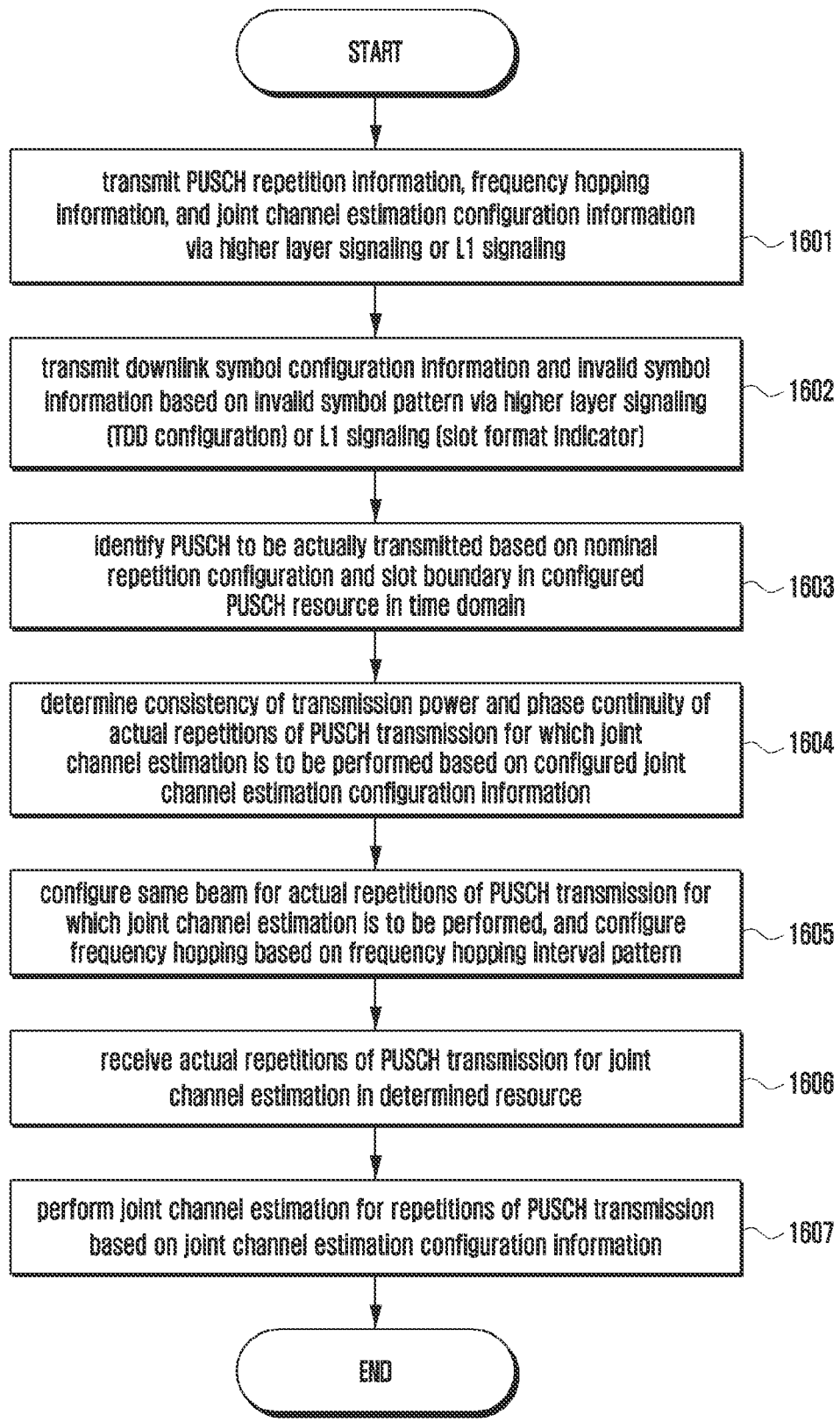
FIG. 16 illustrates operation of a base station that configures joint channel estimation for repetitions of PUSCH transmission according to an embodiment.

FIG. 16 illustrates operation of a base station that configures joint channel estimation for repetitions of PUSCH transmission according to an embodiment.

A base station may transmit at least one of information associated with a PUSCH repetition, information associated with frequency hopping, configuration information associated with joint channel estimation (e.g., on/off information of joint channel estimation, the number of repetitions of PUSCH for which joint channel estimation is allowed, and the like) via higher layer signaling or L1 signaling in step 1601. Subsequently, the base station may transmit downlink symbol configuration information and invalid symbol information based on an invalid symbol pattern via higher layer signaling (TDD configuration) or L1 signaling (slot format indicator) in step 1602. The base station may identify a PUSCH that is to be actually transmitted based on a nominal repetition configuration and a slot boundary in a configured PUSCH resource in the time domain in step 1603, and may determine, based on the configuration information associated with the joint channel estimation, the consistency of transmission power and the phase continuity of actual repetitions of PUSCH transmission for which joint channel estimation is to be performed in step 1604. The base station may configure the same beam for the actual repetitions of PUSCH transmission for which joint channel estimation is to be performed, and frequency hopping may be configured based on a frequency hopping interval pattern. Accordingly, a PUSCH resource in which transmission by the UE is to be actually performed may be identified in step 1605. The base station may repeatedly receive an actual PUSCH in a PUSCH resource in which transmission is actually performed, in step 1606. Subsequently, based on the configuration information associated with the joint channel estimation, the base station may perform joint channel estimation for actually received PUSCH repetitions in step 1607.

Some of steps 1601 to 1607 of FIG. 16 may be omitted or may be performed in parallel. The order of the steps performed in FIG. 16 may vary.

Figure 17:
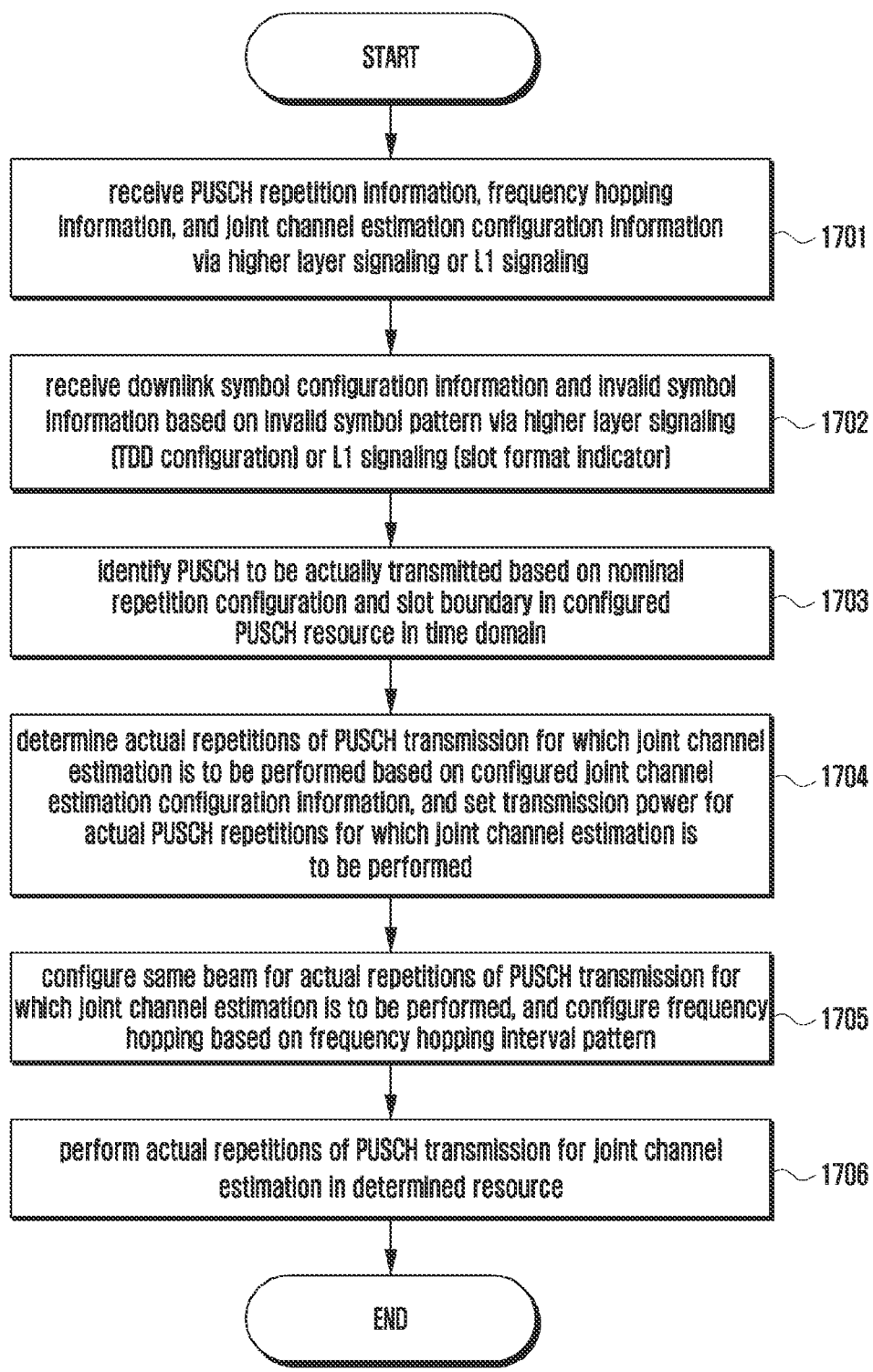
FIG. 17 illustrates operation of a UE for which joint channel estimation for repetitions of PUSCH transmission is configured according to an embodiment.

FIG. 17 illustrates operation of a UE for which joint channel estimation for repetitions of PUSCH transmission is configured according to an embodiment.

A UE may receive at least one of information associated with a PUSCH repetition, information associated with frequency hopping, configuration information associated with joint channel estimation (e.g., on/off information of joint channel estimation, the number of times of repetitions of PUSCH transmission for which joint channel estimation is allowed, and the like) via higher layer signaling or L1 signaling in step 1701. Subsequently, the UE may receive downlink symbol configuration information and invalid symbol information based on an invalid symbol pattern via higher layer signaling (TDD configuration) or L1 signaling (slot format indicator) in step 1702. In addition, the UE may identify a PUSCH to be actually transmitted based on a nominal repetition configuration and a slot boundary in a configured PUSCH resource in the time-domain in step 1703, and may determine actual repetitions of PUSCH for which joint channel estimation is to be performed based on the configured configuration information associated with the joint channel estimation, and may determine (or identify) transmission power of actual repetitions of PUSCH transmission for which joint channel estimation is to be performed in step 1704. In this instance, the UE may perform actual repetitions of PUSCH transmission for which the configured joint channel estimation is to be performed, using the same PUSCH transmission power. In addition, the UE may configure the same beam for actual repetitions of PUSCH transmission for which joint channel estimation is to be performed, and may configure frequency hopping based on a frequency hopping interval pattern in step 1705. Subsequently, in a PUSCH resource in which transmission is to be actually performed, the UE may repeatedly transmit an actual PUSCH for joint channel estimation in step 1706.

Some of steps 1701 to 1706 of FIG. 17 may be omitted, or may be performed in parallel. The order of the steps performed in FIG. 17 may vary.

The base station may need to transmit, to the UE, configuration information for joint channel estimation for repetitions of PUSCH transmission. In this instance, base station may indicate configuration information associated with joint channel estimation to the UE in consideration of the capacity of the base station for joint channel estimation. The method for the base station to configure joint channel estimation may be determined using one of the following methods or a combination thereof.

Method 1

In order to perform joint channel estimation for repetitions of PUSCH transmission, a base station may operate by setting the number of slots, nominal repetitions, actual repetitions, available symbols, and the like as a variable. In this instance, a UE may use the set variable so as to identify repetitions of PUSCH transmission for which joint channel estimation is to be performed as a single PUSCH repetition set. Therefore, the UE may set the same PUSCH transmission power, beam, frequency hopping, and PUSCH occasion with respect to the PUSCH repetition set for which joint channel estimation is to be performed, and may perform transmission.

Method 2

For joint channel estimation for repetitions of PUSCH transmission, a base station may set a threshold value for an interval between discontinuous PUSCH repetitions and may perform joint channel estimation. In this instance, if it is identified, based on the set threshold, that the interval between the discontinuous PUSCH repetitions is less than the set threshold, the UE may perform repetitions of PUSCH transmission based on joint channel estimation configuration information. In this instance, the UE may set the same PUSCH transmission power, beam, frequency hopping, and PUSCH occasion with respect to the discontinuous PUSCH repetitions for which joint channel estimation is to be performed, and may perform transmission. Unlike the above, if the interval between the discontinuous PUSCH repetitions is greater than the set threshold, the base station may determine that joint channel estimation for the discontinuous PUSCH repetitions is not allowed.

Method 3

In order to perform frequency hopping and joint channel estimation with respect to repetitions of PUSCH transmission, a base station may allocate a time-frequency resource to a UE via a bitmap. In this instance, the bitmap may set the location of frequency hopping for an actual repetition or a nominal repetition. In addition, joint channel estimation may be performed with respect to continuous/discontinuous PUSCH repetitions that have phase continuity. The UE may set the same PUSCH transmission power, beam, frequency hopping, and PUSCH occasion with respect to a PUSCH repetition set for which joint channel estimation is to be performed, and may perform transmission.

The base station may configure joint channel estimation for repetitions of PUSCH transmission using the method of controlling joint channel estimation. In addition, the base station may control joint channel estimation using one of the described methods or a combination thereof.

Figure 18:
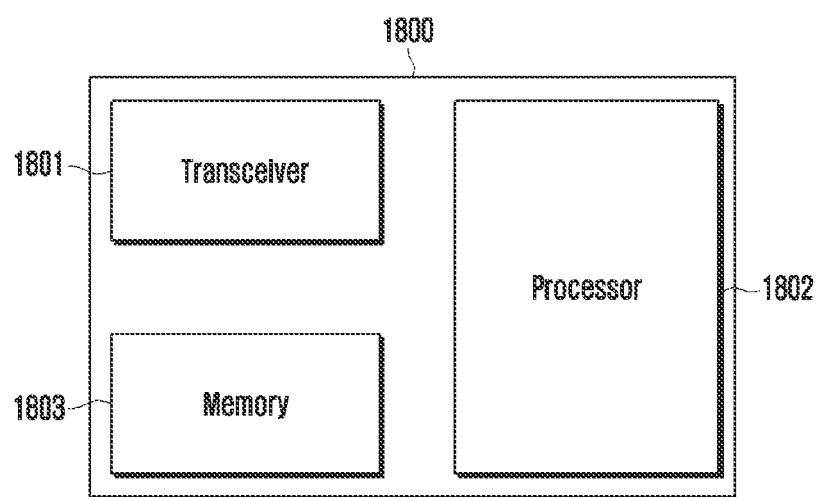
FIG. 18 illustrates the structure of a UE according to an embodiment.

FIG. 18 illustrates the structure of a UE according to an embodiment.

Referring to FIG. 18, a UE 1800 may include a transceiver 1801, a controller (processor) 1802, and a memory 1803. According to an efficient channel and signal transmission or reception method in a 5G communication system corresponding to the above-described embodiments, the transceiver 1801, the controller 1802, and the memory 1803 of the UE 1800 may operate. The elements of the UE 1800 are not limited to the above-described example, and the UE 1800 may include more or fewer elements than the above-described elements. In addition, the transceiver 1801, the controller 1802, and the memory 1803 may be embodied as a single chip.

The transceiver 1801 may include a transmitter and a receiver. The transceiver 1801 may perform signal transmission or reception with a base station. The signal may include control information and data. To this end, the transceiver 1801 may include an RF transmitter that up-converts and amplifies the frequency of a transmitted signal, an RF receiver that low-noise amplifies a received signal and down-converts the frequency of the signal, and the like. In addition, the transceiver 1801 may receive a signal via a wireless channel and output the same to the controller 1802, and may transmit a signal output from the controller 1802 via a wireless channel.

The controller 1802 may control a series of processes in which the UE 1800 operates. For example, the controller 1802 may perform a method of changing the location of an OFDM symbol of a DMRS in consideration of a method of estimating a channel by simultaneously using DMRSs transmitted from a plurality of PUSCHs. To this end, the controller 1802 may include at least one processor. For example, the controller 1802 may include a communication processor (CP) that performs control for communication, and an application processor (AP) that controls a higher layer such as an application program or the like.

The memory 1803 may store control information or data such as information or the like related to channel estimation that uses DMRSs transmitted from a PUSCH included in a signal obtained from the UE 1800 and may have an area for storing data needed for controlling the controller 1802, data produced when the controller 1802 performs control, and the like.

Figure 19:
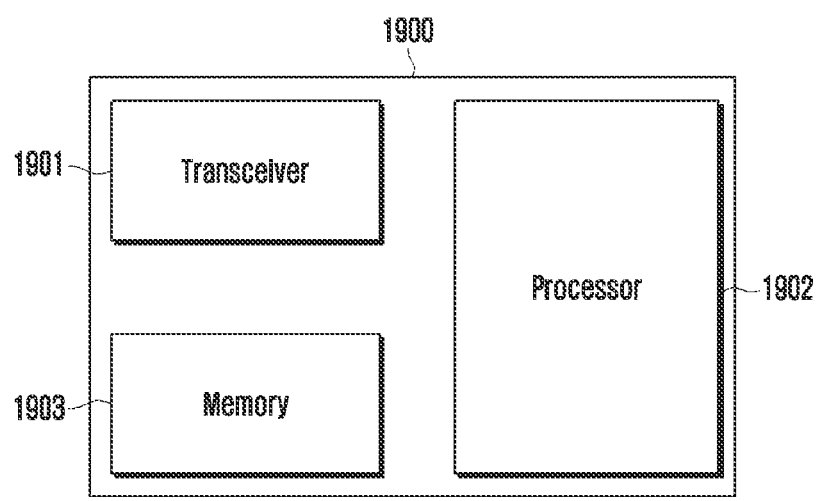
FIG. 19 illustrates the structure of a base station according to an embodiment.

FIG. 19 illustrates the structure of a base station according to an embodiment.

Referring to FIG. 19, a base station 1900 may include a transceiver 1901, a controller (processor) 1902, and a memory 1903. According to an efficient channel and signal transmission or reception method in a 5G communication system corresponding to the above-described embodiments, the transceiver 1901, the controller 1902, and the memory 1903 of the base station 1900 may operate. The elements of the base station 1900 are not limited to the above-described example, and the base station 1900 may include more or fewer elements than the above-described elements. In addition, the transceiver 1901, the controller 1902, and the memory 1903 may be embodied as a single chip.

The transceiver 1901 may include a transmitter and a receiver. The transceiver 1901 may perform transmission or reception of a signal with a UE. The signal may include control information and data. To this end, the transceiver 1901 may include an RF transmitter that up-converts and amplifies the frequency of a transmitted signal, an RF receiver that low-noise amplifies a received signal and down-converts the frequency of the signal, and the like. In addition, the transceiver 1901 may receive a signal via a wireless channel, may output the same to the controller 1902, and may transmit a signal output from the controller 1902 via a wireless channel.

The controller 1902 may control a series of processes in which the base station 1900 operates. For example, the controller 1902 may perform a method of changing the location of an OFDM symbol of a DMRS in consideration of a method of estimating a channel using DMRSs transmitted from a PUSCH. To this end, the controller 1902 may include at least one processor. For example, the controller 1902 may include a CP that performs control for communication, and an AP that controls a higher layer such as an application program.

The memory 1903 may store control information or data such as information or the like related to channel estimation that uses DMRSs transmitted from a PUSCH determined by the base station 1900 or may store control information or data received from the UE, and may have an area for storing data needed for controlling the controller 1902, data produced when the controller 1902 performs control.

Herein, it is understood that each block of the flowchart illustrations, and combinations of blocks in the flowchart illustrations, can be implemented by computer program instructions provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, a unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units or may be implemented to reproduce one or more CPUs within a device or a security multimedia card. The unit in the embodiments may include one or more processors.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a terminal in a communication system, the method comprising:
  receiving, from a base station, configuration information of a repetition of a physical uplink shared channel (PUSCH) via higher layer signaling;
  receiving, from the base station, downlink control information (DCI) including a time domain resource assignment (TDRA) field for the PUSCH;
  identifying, based on the configuration information and the TDRA field, a plurality of time resources for the repetition;
  identifying whether a gap between two consecutive PUSCH transmissions of the repetition is less than a predefined threshold; and
  transmitting, to the base station, the repetition including a plurality of PUSCH transmissions on the plurality of time resources,
  wherein:
    in case that the gap is less than the predefined threshold, a power consistency is maintained across at least the two consecutive PUSCH transmissions of the repetition, and
    in case that the gap exceeds the predefined threshold, the power consistency is maintained across at least PUSCH transmissions of the repetition that are before the gap.

2. The method of claim 1, further comprising:
  identifying whether a frequency hopping is configured for the repetition,
  wherein:
    in case that the frequency hopping is not configured, the power consistency is maintained across at least the two consecutive PUSCH transmissions of the repetition, and
    in case that the frequency hopping is configured, the power consistency is maintained across at least PUSCH transmissions of the repetition that are before the frequency hopping.

3. The method of claim 1, further comprising:
  identifying whether different uplink beams are configured for the two consecutive PUSCH transmissions of the repetition,
  wherein:
    in case that different uplink beams are not configured, the power consistency is maintained across the at least the two consecutive PUSCH transmissions of the repetition, and
    in case that different uplink beams are configured, the power consistency is maintained across at least PUSCH transmissions of the repetition that are configured with a same uplink beam.

4. The method of claim 1,
  wherein the repetition is transmitted by maintaining a phase continuity across at least the two consecutive PUSCH transmissions of the repetition in case that the repetition is transmitted by maintaining the power consistency across at least the two consecutive PUSCH transmissions of the repetition.

5. The method of claim 1,
wherein the repetition is configured as a PUSCH repetition type A or a PUSCH repetition type B.

6. A method performed by a base station in a communication system, the method comprising:
transmitting, to a terminal, configuration information of a repetition of a physical uplink shared channel (PUSCH) via higher layer signaling;
transmitting, to the terminal, downlink control information (DCI) including a time domain resource assignment (TDRA) field for the PUSCH; and
receiving, from the terminal, the repetition including a plurality of PUSCH transmissions on a plurality of time resources,
wherein:
in case that a gap between two consecutive PUSCH transmissions of the repetition is less than a predefined threshold, a power consistency is maintained across at least the two consecutive PUSCH transmissions of the repetition, and
in case that the gap exceeds the predefined threshold, the power consistency is maintained across at least PUSCH transmissions of the repetition that are before the gap, and
wherein the plurality of time resources is based on the configuration information and the TDRA field.

7. The method of claim 6,
wherein:
in case that a frequency hopping is not configured for the repetition, the power consistency is maintained across the at least the two consecutive PUSCH transmissions of the repetition, and
in case that the frequency hopping is configured, the power consistency is maintained across at least PUSCH transmissions of the repetition that are before the frequency hopping.

8. The method of claim 6,
wherein:
in case that different uplink beams are not configured for the two consecutive PUSCH transmissions of the repetition, the power consistency is maintained across the at least the two consecutive PUSCH transmissions of the repetition, and
in case that different uplink beams are configured, the power consistency is maintained across at least PUSCH transmissions of the repetition that are configured with a same uplink beam.

9. The method of claim 6,
wherein the repetition is configured as a PUSCH repetition type A or a PUSCH repetition type B.

10. A terminal in a communication system, the terminal comprising:
a transceiver; and
a processor coupled with the transceiver and configured to:
receive, from a base station, configuration information of a repetition of a physical uplink shared channel (PUSCH) via higher layer signaling;
receive, from the base station, downlink control information (DCI) including a time domain resource assignment (TDRA) field for the PUSCH;
identify, based on the configuration information and the TDRA field, a plurality of time resources for the repetition;
identify whether a gap between two consecutive PUSCH transmissions of the repetition is less than a predefined threshold; and
transmit, to the base station, the repetition including a plurality of PUSCH transmissions on the plurality of time resources,
wherein:
in case that the gap is less than the predefined threshold, a power consistency is maintained across at least the two consecutive PUSCH transmissions of the repetition, and
in case that the gap exceeds the predefined threshold, the power consistency is maintained across at least PUSCH transmissions of the repetition that are before the gap.

11. The terminal of claim 10,
wherein the processor is further configured to identify whether a frequency hopping is configured for the repetition, and
wherein:
in case that the frequency hopping is not configured, the power consistency is maintained across the at least the two consecutive PUSCH transmissions of the repetition, and
in case that the frequency hopping is configured, the power consistency is maintained across at least PUSCH transmissions of the repetition that are before the frequency hopping.

12. The terminal of claim 10,
wherein the processor is further configured to identify whether different uplink beams are configured for the two consecutive PUSCH transmissions of the repetition, and
wherein:
in case that different uplink beams are not configured, the power consistency is maintained across the at least the two consecutive PUSCH transmissions of the repetition, and
in case that different uplink beams are configured, the power consistency is maintained across at least PUSCH transmissions of the repetition which are configured with a same uplink beam.

13. The terminal of claim 10,
wherein the repetition is transmitted by maintaining a phase continuity across the at least the two consecutive PUSCH transmissions of the repetition in case that the repetition is transmitted by maintaining the power consistency across the at least the two consecutive PUSCH transmissions of the repetition.

14. The terminal of claim 10,
wherein the repetition is configured as a PUSCH repetition type A or a PUSCH repetition type B.

15. A base station in a communication system, the base station comprising:
a transceiver; and
a processor coupled with the transceiver and configured to:
transmit, to a terminal, configuration information of a repetition of a physical uplink shared channel (PUSCH) via higher layer signaling;
transmit, to the terminal, downlink control information (DCI) including a time domain resource assignment (TDRA) field for the PUSCH; and
receive, from the terminal, the repetition including a plurality of PUSCH transmissions on a plurality of time resources,
wherein:
in case that a gap between two consecutive PUSCH transmissions of the repetition is less than a predefined threshold, a power consistency is maintained across at least the two consecutive PUSCH transmissions of the repetition, and in case that the gap exceeds the predefined threshold, the power consistency is maintained across at least PUSCH transmissions of the repetition that are before the gap, and wherein the plurality of time resources is based on the configuration information and the TDRA field.

16. The base station of claim 15, wherein:

in case that a frequency hopping is not configured for the repetition, the power consistency is maintained across the at least the two consecutive PUSCH transmissions of the repetition, and in case that the frequency hopping is configured, the power consistency is maintained across at least PUSCH transmissions of the repetition that are before the frequency hopping.

17. The base station of claim 15, wherein:

in case that different uplink beams are not configured for the two consecutive PUSCH transmissions of the repetition, the power consistency is maintained across the at least the two consecutive PUSCH transmissions of the repetition, and in case that different uplink beams are configured, the power consistency is maintained across at least PUSCH transmissions of the repetition that are configured with a same uplink beam.

18. The base station of claim 15, wherein the repetition is configured as a PUSCH repetition type A or a PUSCH repetition type B.

* * * * *